United States Patent [19]
McClung et al.

[11] Patent Number: 5,302,289
[45] Date of Patent: Apr. 12, 1994

[54] MATERIAL SEPARATION PROCESS AND APPARATUS

[75] Inventors: Lonnie McClung; Michaelene J. McClung, both of Prosser, Wash.

[73] Assignee: Material Separation, Inc.

[21] Appl. No.: 943,938

[22] Filed: Sep. 11, 1992

Related U.S. Application Data

[63] Continuation-in-part of Ser. No. 757,710, Sep. 11, 1991, abandoned, and a continuation-in-part of Ser. No. 789,302, Nov. 8, 1991, abandoned.

[51] Int. Cl.⁵ ............................................. B01D 21/02
[52] U.S. Cl. ................................. 210/634; 210/802; 210/519; 210/521
[58] Field of Search ............... 210/634, 776, 802, 800, 210/805, 806, 320, 529, 521, 522; 204/158, 163, 165

[56] References Cited

U.S. PATENT DOCUMENTS

| | | |
|---|---|---|
| 4,056,477 | 11/1977 | Ravitts .............................. 210/519 X |
| 4,746,421 | 5/1988 | Turbitt ..................................... 209/3 |
| 4,784,757 | 11/1988 | Nelson et al. ........................ 209/159 |

*Primary Examiner*—Frank Spear
*Attorney, Agent, or Firm*—Mark W. Hendricksen

[57] ABSTRACT

This invention generally provides a process and apparatus for the separation of material and more particularly, the separation of material(s) using a separation fluid and based upon the relative buoyancies of the components of the material solution. This invention more particularly provides an apparatus and a process in which the feedstock is first introduced into a separation hopper wherein partial separation occurs by the less buoyant solid particles contained in the feedstock descending to and entering a separation chamber. The separation fluid flowing upwardly in the separation chamber is adaptable to match the settling velocity of the desired solid particle separation. The less buoyant particles settling to the bottom of the separation chamber are discharged as clean or separated material, whereas the more buoyant particles are carried upward by the flow of the separation fluid and discharged from the upper end of the separation chamber to either one or more additional or similar devices or recirculated to one or more early stages in the system process and apparatus.

20 Claims, 13 Drawing Sheets

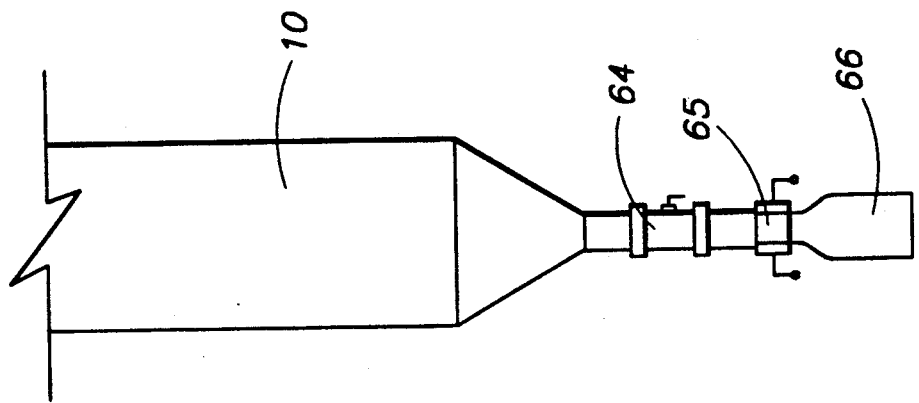

MATERIAL SEPARATION PROCESS AND APPARATUS

CONTINUATION-IN-PART APPLICATION

This application is a continuation-in-part application, claiming the benefit of the prior filing date(s) for that portion of this application that was disclosed in prior patent applications described herein. The first prior filing was patent application Ser. No. 07/757,710, filed Sep. 11, 1991, now abandoned, in which one of the two inventors named herein was named therein, namely LONNIE MCCLUNG. The second prior filing was patent application Ser. No. 07/789,302, filed Nov. 8, 1991, now abandoned, and the sole named inventor named therein was LONNIE MCCLUNG, one of the two named inventors herein. Said second application is pending as of the date of the filing of this application. Application Ser. No. 07/789,302, has the benefit of parent application Ser. No. 07/757,710, filed Sep. 11, 1991, under 35 USC 120, as does this application.

FIELD OF THE INVENTION

This invention generally provides a process and apparatus for the separation of material and more particularly, the separation of material(s) based upon the material's relative buoyancy and through the use of a separation fluid. This invention can be used to mix, clean, classify, separate and/or purify feedstock containing liquids and/or finely divided solid materials.

BACKGROUND OF THE INVENTION

Printed material discloses a great number of proposals for cleaning contaminated soil; cf., for example, the article "CLEANING EXCAVATED SOIL USING EXTRACTION AGENTS: A STATE-OF-THE-ART REVIEW" BY R. Raghavan et al., U.S. Environmental Protection Agency EPA/600/2-89/034 of June 1989, and more specifically the literature references given in the pages 46-50 therein.

A number of operations have been designed for the use on an industrial large scale and may be exemplified by excerpts from the following:

| Primary Unit Operations | Reference |
| --- | --- |
| Extraction, flotation | Nunno, Hyman and Pheiffer (1988); Assink (1987) |
| Extraction, hydrocyclones | Nunno, Hyman and Pheiffer (1988): Assink (1987) |
| Floatation low frequency vibration | Nunno, Hyman and (1988); Sonnen and Klingebiel (1988) |
| Water-jet scrubber | Heimhard (1988) |
| Solvent extraction | Nunno, Hyman and Pheiffer (1988) |
| Water-Knife Scrubber, Extraction | Traver and Freestone (1985) Scholz and Milanowski (1983) |
| Trommel washer, jig separator | Ayres (1990) |

U.S. Pat. No. 4,784,757, issued on Nov. 15, 1988, to Nelson and McClung, relates to a device for the separation of solids of different specific gravities by means of a substantially laminar upward flow of water, especially for facilitating the recovery of gold from mineral feedstock. The device presented in said U.S. patent specification in particular is distinguished in that the material separation of the mineral feedstock mixtures listed can be achieved at a minimum expenditure of those working elements required to be kept in motion. U.S. Pat. No. 4,784,757 provides for the use of water as separation and transferring liquid, wherein an ascending stream of the water employed as the separation liquid, the larger and/or heavier particles will settle and be discharged from the bottom of the separation zone, while smaller and/or lighter solid particles are carried upward and discharged from the top of the separation zone. It was stated that the effluent in an amount of about 90% of the initial water stream is free from finely divided particulate contaminants and may be returned to the source it was taken from.

The present invention is based on the recognition that the separation procedure outline in said U.S. patent makes a suitable starting point for the development of a highly efficient process in order to attain the objects of this invention. The teaching provided hereinbelow of the invention describes the further developments and the device members and process features by means of which the mixing, cleaning, separation and/or preconditioning of the feedstock can be accomplished, said device members and process features having been clearly improved in various ways over cited references.

Prior attempts at material separation devices and processes have been plagued with a number of different problems, namely: they use and discharge too much separation fluid or water; they have been unable to separate fine and finely differentiated particles with any reasonable degree of efficiency or effectiveness; they have been unable to provide such a process or device which is relatively inexpensive to construct and operate; and they have been unable to provide a system that operates effectively despite wide variations in the composition of the feedstock.

This invention solves the forenamed problems to a degree not heretofore achieved on any scale, let alone for a commercial production unit capable of continuous production.

SUMMARY OF THE INVENTION

This invention generally provides a process and an apparatus for the separation of material using a separation fluid.

It is an object of this invention to provide a material separation process and apparatus that can separate materials so small and fine in nature that no one has heretofore been able to achieve. This invention further achieves this object in a process and apparatus that can be used on a large volume, continuous operation and commercial basis. This object is accomplished, among other ways, through separation in stages and through the achievement and maintenance of a constant velocity of the separation fluid in the final stages of the separation process, despite variations in feedstock composition.

It is a further object of this invention to provide a material separation process and apparatus that utilizes a separation fluid and maintains that separation fluid at a relatively constant velocity despite large variations in the composition of the feedstock, which has heretofore not been accomplished. This is accomplished, among other ways, through the total system balance as more fully explained herein, and the means by which relative pressures are maintained through overflow and static head means.

It is a further object of this invention to provide a material separation process and apparatus that minimizes the amount of waste separation fluid, which can, but need not be, water. This is accomplished, among other ways, by continually re-using the separation fluid in a closed system, both clean and mixed with feedstock material, and through the effective separation of the separation fluid from the separated portion of the feedstock material.

It is a further object of this invention to provide a material separation process and apparatus that can be used not only to separate incoming material from other material of a different buoyancy, but also to separate the desired incoming material from incoming liquids mixed therein. This is accomplished, among other ways, through the maintenance of a steady upward velocity in a separation chamber which does not allow mixed, contaminated or dirty separation fluid to descend with the material being separated.

It is a further object of this invention to provide a material separation process and apparatus that accomplishes the entire separation process with a separation fluid and does not utilize problematic, inaccurate and high maintenance devices such as screen and other such hardware devices. This is accomplished, among other ways, because separation of the desired material in this invention is solely by using a separation fluid and not a screen or other similar hardware device.

It is a further object of this invention to provide a material separation process and apparatus that is relatively simple in design, eliminating the need for substantial control equipment and thereby making this invention relatively inexpensive, which this invention is and accomplishes.

It is a further object of this invention to provide a material separation process and apparatus which can be used on a continuous, economical and commercial scale basis, which this invention accomplishes.

It is a further object of this invention to provide a material separation process and apparatus which minimizes the use of extensive hardware, such as pumps, pressure regulators, controllers and the like. This is accomplished, among other ways, through the efficient and simple design methods, which has resulted in the need for only one liquid pump, one slurry pump and reliable mechanical controls.

It is a further object of this invention to provide such a process and apparatus that can be constructed in such a form as to be mobile and self-contained, which this invention accomplishes. This design and operating mode of the mobile units according to the invention enable the units to be moved to the place of operation such as to avoid any substantial increase in expenses caused by the transporting of contaminated feedstock to the unit.

A feature of the invention is characterized in that the liquid phase is established by introducing and mixing the feedstock with a liquid, subsequently scrubbing it, washing it and then tumbling it, thereby causing the fine solid particles to be liberated from one another and held in suspension in a liquid phase slurry type solution, which includes clean oversize material. The initial liquid phase is separated from the clean oversize solids by way of a drum screen classifier. The material passing through the drum screen classifier, referred to as the mixed feedstock solution, is delivered to the separation area by way of a slurry pump and feed line.

The mixed feedstock solution then passes into the hopper separation means feed zone area and then into the first part of the separation process, referred to as the first separation zone, in which the separation fluid is static or near static.

The general flow created by the inflowing mixed feedstock solution in the main portion of the hopper separation means is upward and diagonal due to the static head established by operation of the system. This area is referred to as the second separation zone. The velocity of the upward flow of mixed feedstock solution is controllable and is adapted to the velocity of the sedimentation of the particulate feedstock contained, so that the desired fraction of the liquid phase and fines rise and are discharged from the overflow at the upper end of the second separation zone, leaving the desired fraction of the particulate feedstock to migrate downwardly through the static water area of the second separation zone, thereafter entering the third separation zone attached to and in fluid communication with said second separation zone at the lower end thereof.

Another feature of the process and apparatus provides for the placement of tubes and/or dividers diagonally in said second separation zone at an angle that will maximize the reduction of solid particle size separation in relation to the ascending laminar flow velocity in the liquid phase, as a result of rising at the desired angle. Further, the placement of tubes and/or dividers assist in reducing turbulence of the mixed feedstock solution and providing for a more desirable, calmer laminar flow.

Another feature of the invention provides for the placement of a divider that extends above the level of the second separation zone overflow and below the lowest portion of the second separation zone which creates an area of introduction for the mixed feedstock solution, referred to as a feed zone, and which requires the mixed feedstock solution to descend to the lower end of the hopper separation means before its own flow causes it to ascend through the second separation zone.

Another feature of this invention provides for the placement of a second adjustable and removable divider, referred to as a gate means, along the top of the tubes extending above the level of the second separation zone overflow. The gate means can be placed at any desired point between the second separation zone overflow and zone of introduction for the mixed feedstock solution, depending on the desired result.

The gate means allows control of the ascending flow rate of the mixed feedstock solution in the second separation zone. The ability to control the ascending flow rate of the mixed feedstock solution in the second separation zone eliminates the need to adjust the volume of the mixed feedstock solution, while the desired solid particle size separation may vary. The adjustment and control of the gate means also allows variance of the volume of the mixed feedstock solution while maintaining the required ascending flow rate required for achieving the desired particle size separation.

Another feature of the invention provides for an upwardly flowing separation fluid that passes through the separation chamber in at least one lower section, referred to as a third separation zone, in a substantially turbulent flow and in at least one further section designated as "fourth separation zone" downstream from (i.e. situated above) the third separation zone, and which flows in a substantially laminar flow. The less buoyant portion of the mixed feedstock solution is introduced from the second separation zone above the turbulent third separation zone. The ascending velocity of the separation fluid in the third and fourth separation zones is controllable in the process according to the invention and is adapted to match the velocity of the sedimentation of the particulate feedstock contained, so that at least part of the particulate feedstock migrates downwardly through the third separation zone and leaves said third separation zone at the lower end thereof.

The portions which are to be removed from the feedstock and have the comparably higher buoyancy and/or the portions of the feedstock which are soluble in or homogeneously miscible with the separation fluid are discharged at the upper end of the fourth separation zone.

In a further embodiment of the invention, an upwardly flowing separation fluid that ascends through the third (lower) separation zone ascending through and being discharged from the overflow at the top of the second separation zone, eliminating the static water area at the lower end of the second separation zone, allows the separation of the desirable solid particulate matter from the liquids contained in the mixed feedstock solution.

A further embodiment of this invention provides for the mixed feedstock solution to be directed through the third separation zone with the descending solids being discharged from the lower end or bottom of the third separation zone as waste and/or for further processing or treatment, whereas all liquids contained in the mixed feedstock solution are discharged from the overflow at the upper end of the second separation zone for further treatment and/or recycling through the process, or through the discharge from the upper end of the separation chamber.

In a further embodiment the invention relates to the use of the described process for classifying, separation and/or purifying mixtures containing finely divided solid materials. The term "multi-component mixtures" as used herein is understood to denote materials of the same nature and/or materials different in nature. Within the definition according to the invention, a particulate multi-component mixture of a uniform chemical nature is identified by a non-uniform behavior in the upwardly flowing separation fluid in the second and/or fourth separation zone(s), said non-uniform behavior in the first place being due to the variation in particle size of the particulate material under consideration.

Multi-component systems in accordance with the original meaning of the term as well as with the definition according to the invention are admixtures of different materials which at least in part contain particulate solids. Said multi-component mixtures may exclusively consist of mixtures of particulate solids, while alternatively they may comprise particulate solids or particulate mixtures of solids in admixture with liquid components.

An important feature of the invention relates to the use of the process and apparatus for the decontamination of contaminated soil. Especially considered, as the contaminants to be removed, are radioactive substances and/or noxious chemicals. The noxious chemicals involved may be liquid and/or solid components of both inorganic and/or organic origin.

Other objects, features and advantages of this invention will appear from the specification, claims and accompanying drawings which form a part hereof. In carrying out the objects of this invention, it is to be understood that its essential features are susceptible to change in design and structural arrangement with only one preferred embodiment being illustrated in the accompanying drawings, as required.

BRIEF DESCRIPTION OF DRAWINGS

In the accompanying drawings which form a part hereof:

FIG. 14 shows an example of one application of a means to receive certain types of material, such as heavy metals, at the lower end of the separation chamber.

DESCRIPTION OF THE PREFERRED EMBODIMENT

Figure 1:
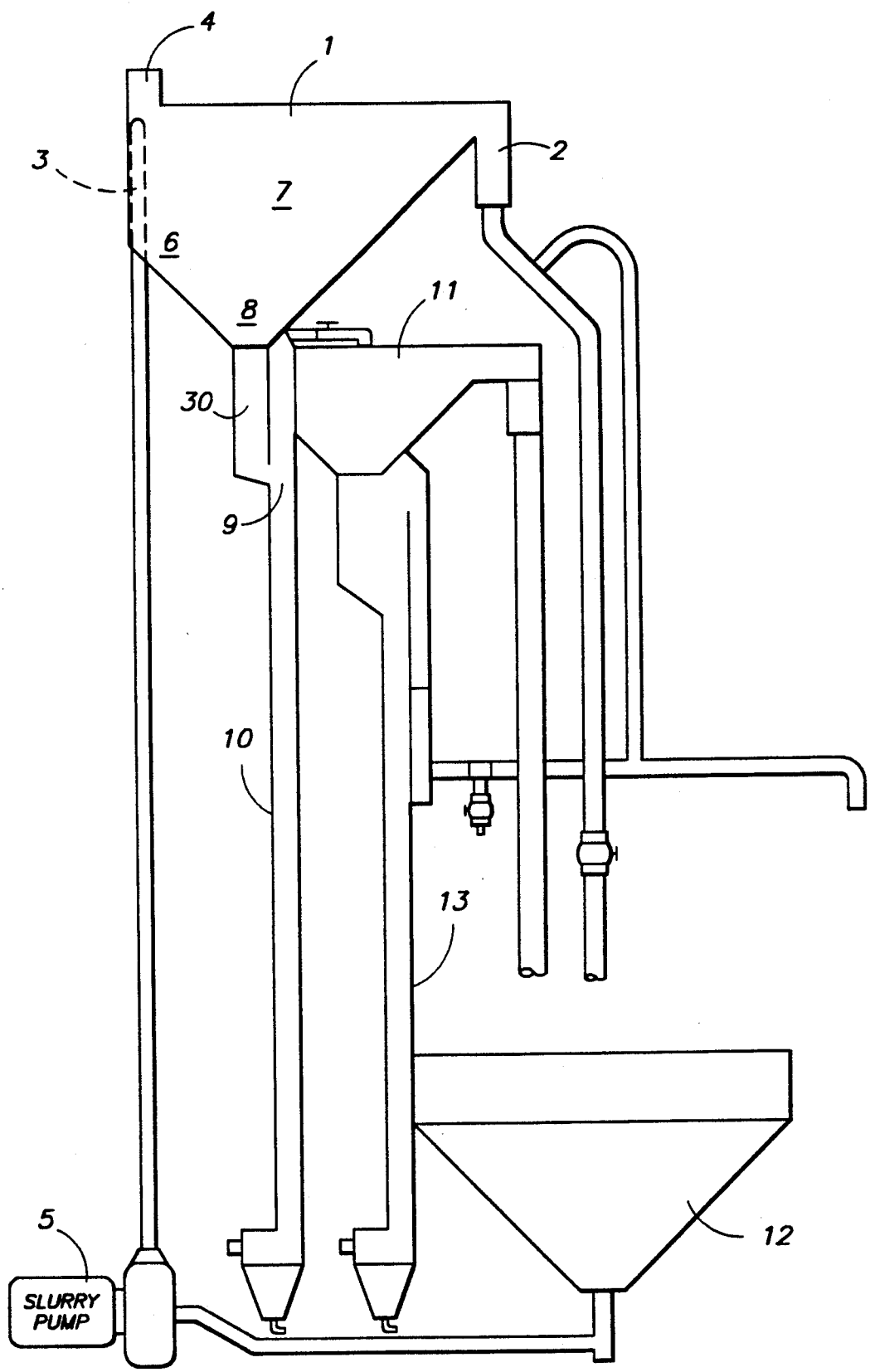
FIG. 1 illustrates one two stage application of the hopper separation means, separation chamber and some related plumbing of one embodiment of the invention.

This invention generally pertains to a material separation system, including a process and an apparatus for the separation of materials which can be placed in an liquid based solution.

Many of the fastening and connection means and other components utilized in this invention are widely known and used in the field of the invention described, and their exact nature or type is not necessary for an understanding and use of the invention by a person skilled in the art or science, and they will not therefore be discussed in significant detail.

The various components shown or described herein for any specific application of this invention can be varied or altered as anticipated by this invention. This invention comprises a unique combination of elements, each element of which can be accomplished by one of several different means or variations for a specific application of this invention. The practice of a specific application of any element may already be widely known or used in the art or by persons skilled in the art or science and each will not therefore be discussed in significant detail.

The overall components, elements, features or steps of this invention are: a feedstock feeder; a washing plant means 13; a drum classifier 18; a slurry tank 12 and slurry pump 5; a hopper separation means 1 with two separation zones; a separation chamber 10 with two separation zones; a separated material system to remove targeted material for separation; a clean separation fluid removal and recirculation means; and a system balance and control means.

Schematic system diagrams of examples of applications of this invention are shown in FIGS. 2, 3, 4 and 5.

Figure 3:
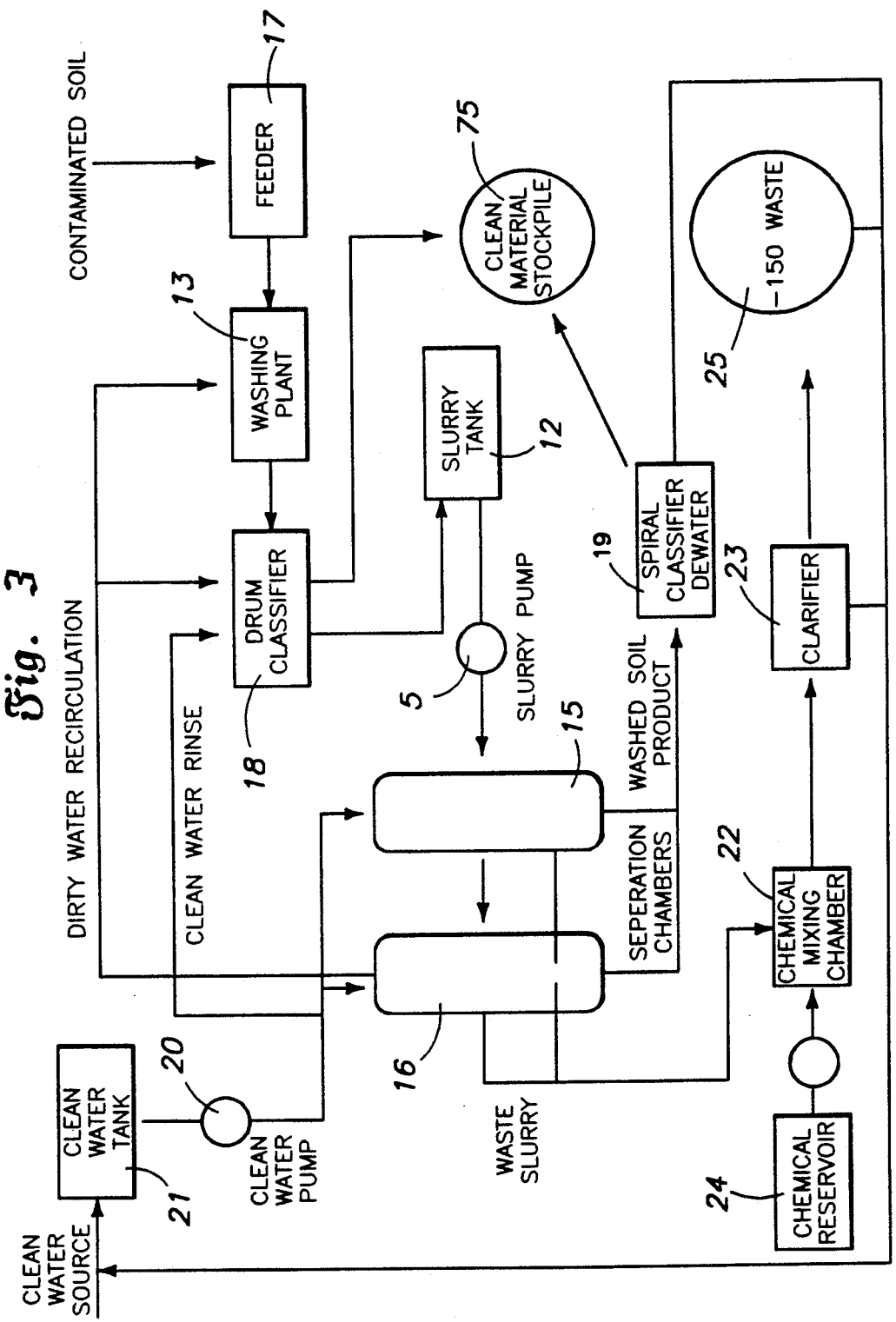
FIG. 3 is a flow diagram of one example of a two stage material separation system.

Referring to FIG. 3 as exemplary, it illustrates an example of a two stage separation system. The feedstock enters the feeder 17, is delivered to the washing plant means 13, wherein it is mixed with dirty separation fluid from the separation chamber 10 and the hopper separation means 1, becoming a mixed feedstock solution.

The material is then delivered to the drum classifier 18, wherein more dirty separation fluid is added to assist the classification process. The material not making through the classification screen is rinsed with clean separation fluid and delivered to the clean material stockpile 75. The mixed feedstock solution passing through the drum classifier is deposited in the slurry tank 12 and pumped therefrom by the slurry pump 5, also referred to as a first pump means 5.

The mixed feedstock solution is then delivered to the first hopper separation means 1, more details of which are discussed herein. Separated material from the first separation stage is then delivered to the spiral classifier 19, dewatering means, wherein the material is separated from the separating fluid.

The separation fluid is then delivered to the clean fluid tank 21, from which it is pumped by the clean fluid pump 20 to the clean fluid control tank 50.

Figure 4:
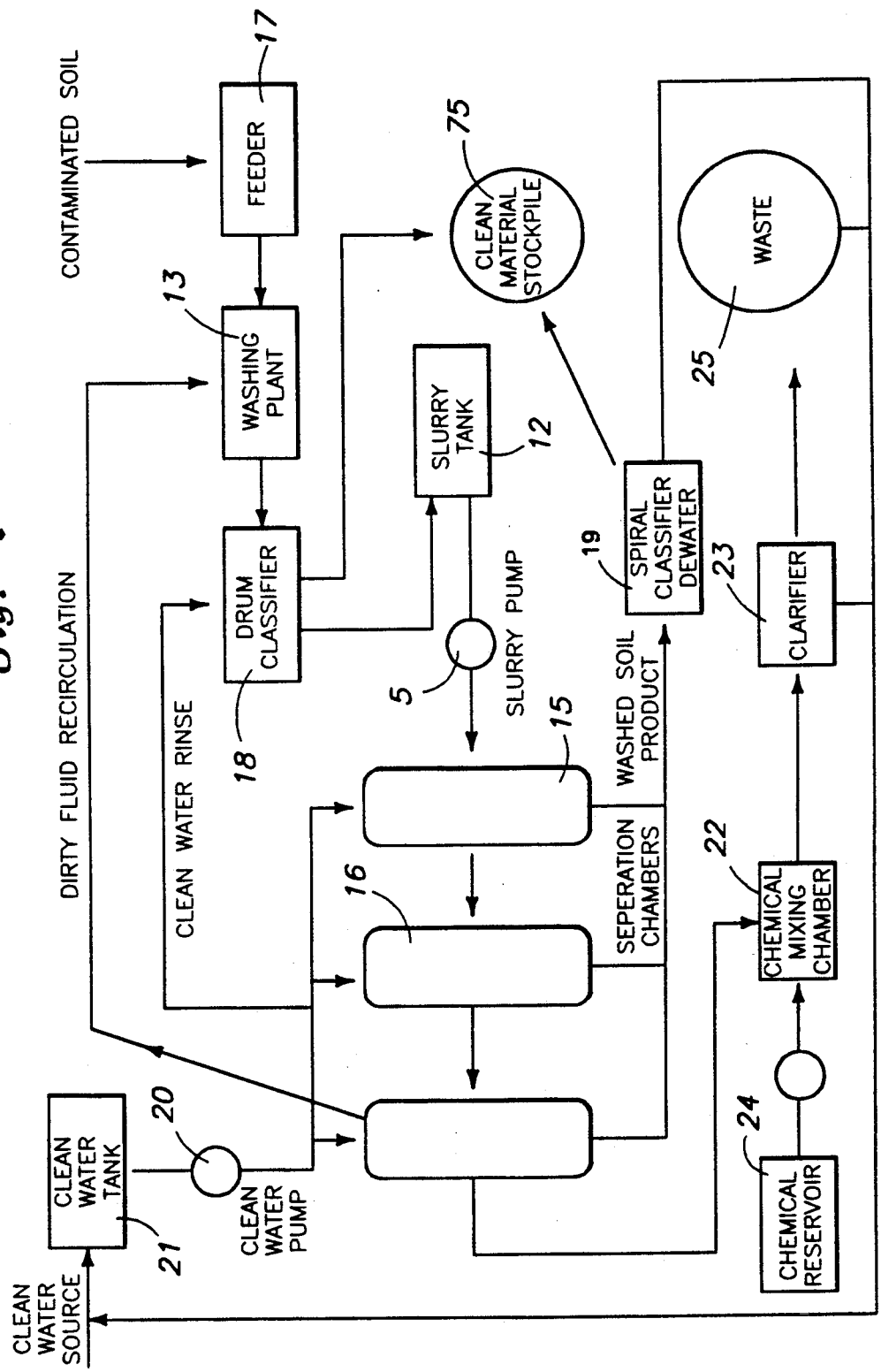
FIG. 4 is a flow diagram of one example of a three stage material separation system of the invention.

FIG. 4 is virtually the same as FIG. 3, except that it contains three separation stages instead of two.

The feedstock feeder receives the feedstock and provides it to the washing plant means 13. Feeders are well known in the industry, with there being numerous different types, any of which can be used to practice that component of this invention, depending on the specific application and feedstock used. For instance conventional conveyors may be used for soil material, or closed feeder systems may be appropriate, depending on the peculiarities of the feedstock and its handling requirements.

The feedstock is supplied to a mixing zone of the washing plant means 13. The washing plant means 13 is shown in FIG. 3 and is shown in more detail in FIG. 10, in relation to the drum classifier 18, the slurry tank 12 and the first pump means 5, also referred to as the slurry pump 5.

The washing plant means 13 according to this invention and unlike other available washing plants, is a closed system with a mixing zone 45 to mix the feedstock with a mixture of the separation fluid and "dirty" separation fluid, which forms a solution with a slurry-like texture and consistency. The dirty separation fluid, which is water in the application illustrated in FIG. 3, is actually a combination of the separation fluid and material and/or liquid that has already passed through the system and was not separated out.

Figure 10:
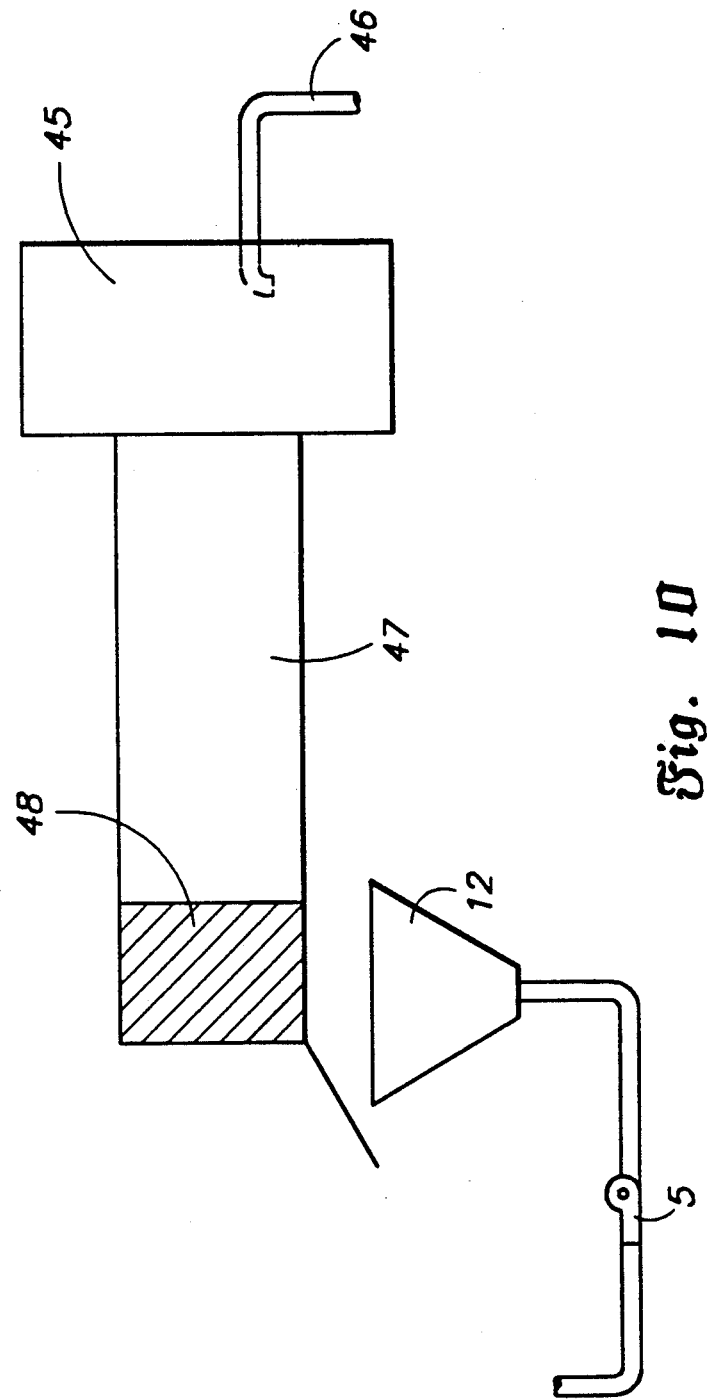
FIG. 10 is an elevation view of one application of the closed washing plant means, drum classifier, slurry tank and slurry pump.

FIG. 10 shows the dirty separation fluid input 46 to the mixing zone 45, the scrubbing zone 47 of the washing plant means 13. From the mixing zone 45 of the washing plant means 13, the material is delivered to the scrubbing zone 47 thereof, wherein the mixture is tumbled, paddled and further mixed as it is augured through. FIG. 10 also shows the drum classifier 18, which includes an area where dirty separation fluid is added to assist in the classification process, designated as area 48. There is also pure or clean separation fluid added to large material discharged from the drum classifier 18, a rinse bar sprays the larger material to clean it off before it is taken to the clean material stockpile 75.

FIG. 10 further shows the slurry tank 12 and the slurry pump 5 configured relative to the drum classifier 18 and washing plant means 13.

Mixing the incoming feedstock with the forenamed combination of liquid and solids is important to the operation of the system, in that it allows the continual re-use of the separation fluid, thereby decreasing its discharge, and it increases the ability to liberate different components of the feedstock from one another in solution.

An example of this is where hydrocarbons are to be removed from soil and the separation fluid is water. Typically a surfactant is added to the soil to assist in liberating the hydrocarbon from the soil. The addition to the feedstock of the combination of water and finer soil which already passed through the system, is believed to substantially assist in the liberation of the hydrocarbons from the soil and the mixture of the feedstock solution versus if clean water alone were added.

Additional or other liquids or pre-treatment means can be added to the feedstock solution in the washing plant, depending on the specific needs for the application.

There are many different types of washing plants known and available which can be used in any given application of this invention. However, it is preferred to utilize a closed washing plant means 13 as described herein so that the amount of separation fluid in the overall system can be monitored, controlled and reduced, whereas most, if not all, washing plants available in the industry are open in nature.

As shown in FIG. 3 and as further illustrated in FIG. 10, once the feedstock leaves the washing plant means 13, it enters a drum classifier 18, where it is rinsed and classified. The larger components of the mixed feedstock solution are rinsed and removed for stockpiling or other disposition. There are known rinsers and drum classifiers 18 that can be used for this invention.

As discussed above, in addition to the incoming mixed feedstock solution, there are two other inputs to the drum classifier, namely a dirty separation fluid addition upstream from the classification screen to assist in the classification process, and a clean or pure separation fluid addition, which is the rinsing or cleaning or the larger material not passing through the screen and on its way to the clean material stockpile 75.

The mixture which is allowed through the drum classifier 18, referred to as the mixed feedstock solution, enters a slurry tank 12 and is then pumped by a first pump means 5, through a feed line and into the feed zone 70 of a hopper separation means 1. The slurry tank 12 and first pump means 5 to pump the mixed feedstock solution, which is in slurry form, can be any one of a number of known, conventional hoppers and pumps appropriate for the specific application, as contemplated by the invention.

The hopper separation means 1 is shown in different examples of applications in FIGS. 1, 2, 5, 6, 7, and 8.

Figure 6:
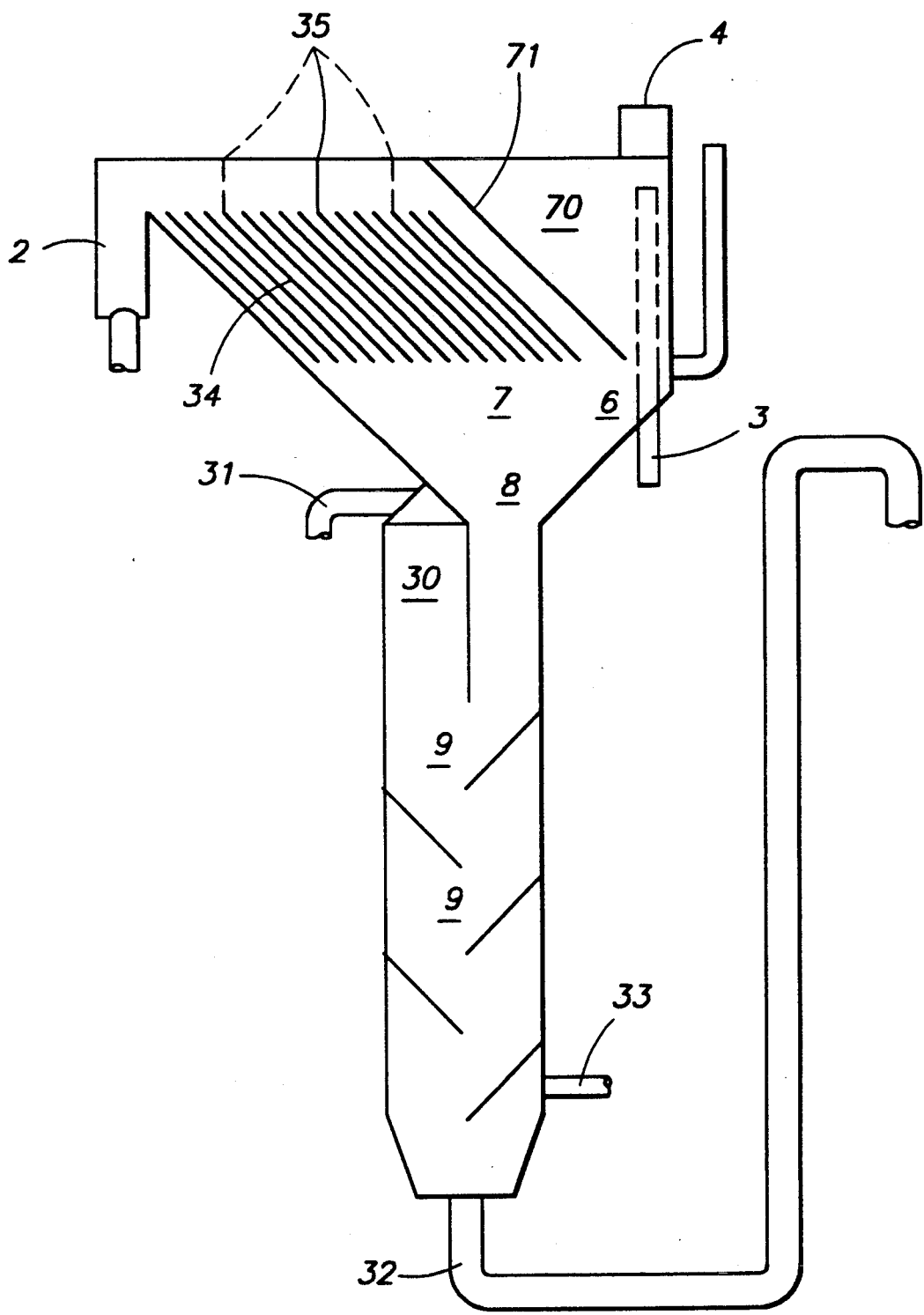
FIG. 6 shows one example of a cross-section of one application of the hopper separation means, wherein the mixed feedstock solution is fed upward and against a deflection means.
Figure 7:
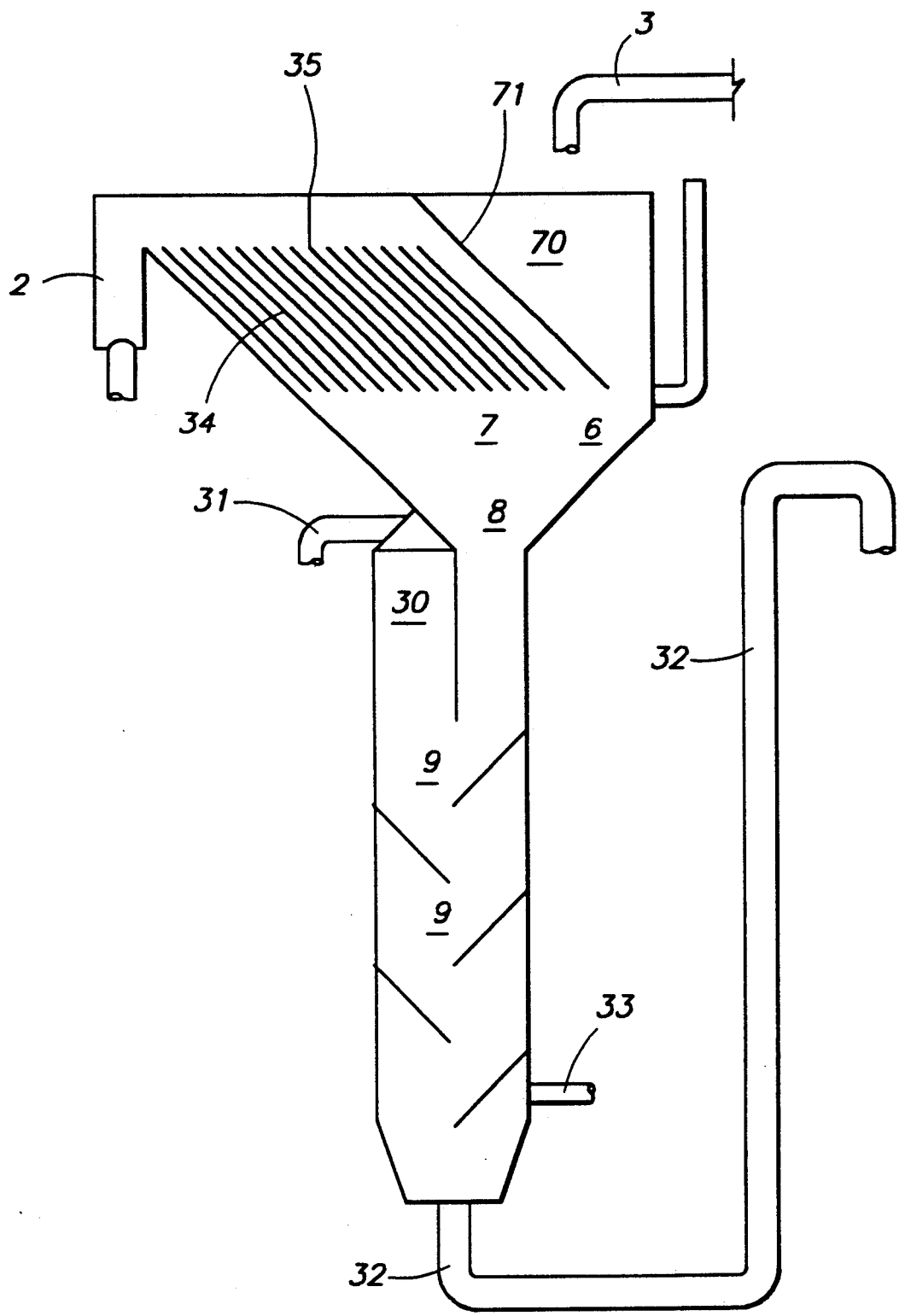
FIG. 7 shows one example of a cross-section of another application of the hopper separation means wherein the feedstock is fed by pouring or dumping it in the top of the hopper separation means.

FIG. 6 shows an application of the invention wherein the mixed feedstock solution is fed upwardly by line 3 such that the solution impacts the hood 4. FIG. 7 shows an application of the invention wherein the mixed feedstock solution is fed by pouring or dumping it into the feed zone 70 through line 3.

Figure 8:
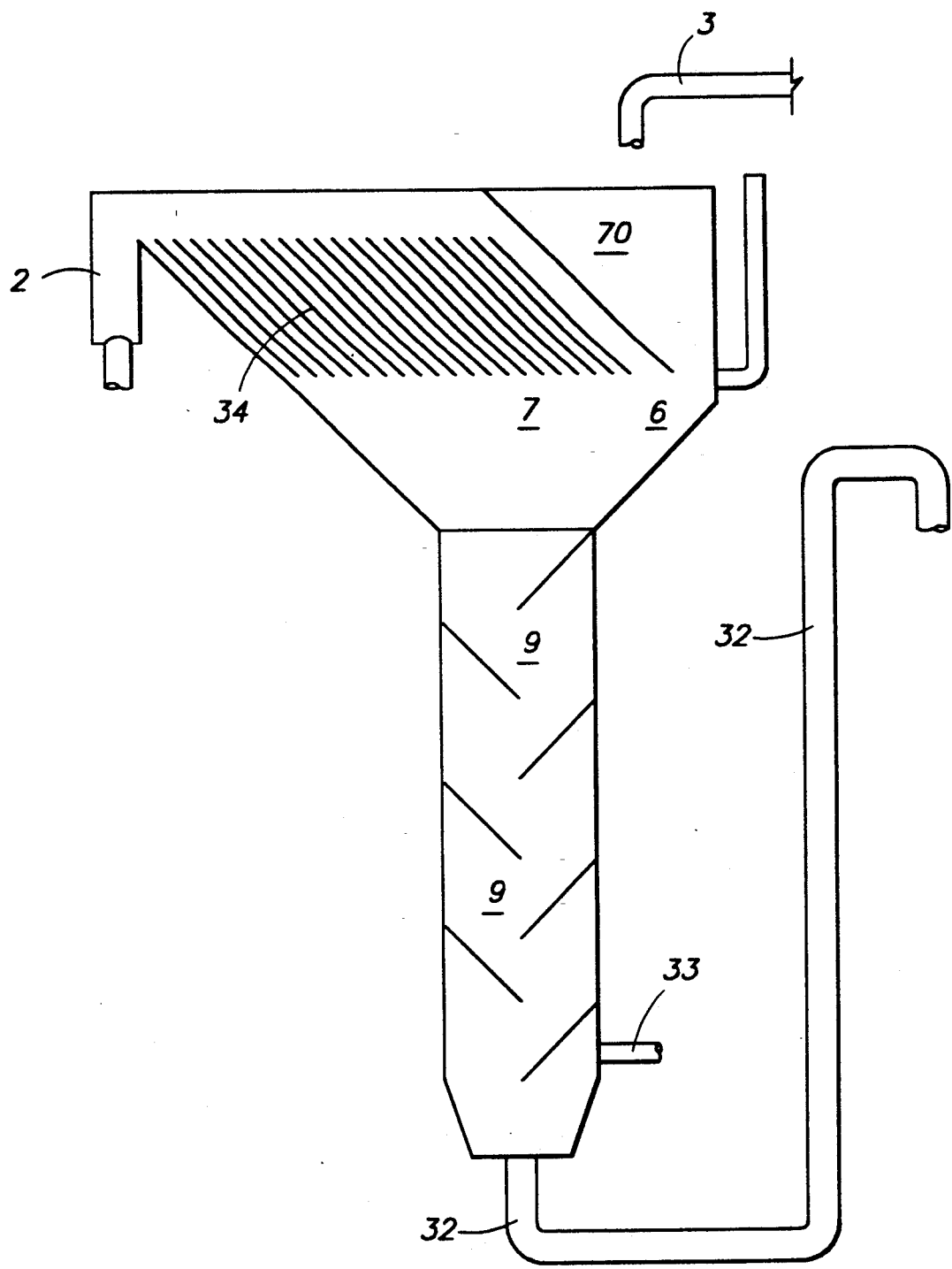
FIG. 8 shows an example of a cross-section of another application of the hopper separation means wherein the feedstock is fed by pouring or dumping it in the top of the hopper separation means.

FIG. 8 illustrates yet another embodiment of the invention wherein the path of descent is a little different, such configuration being more appropriate in applications wherein it is desired to have all the solids settle or to separate the incoming liquid. In the embodiment shown in FIG. 8, only the overflow method is used as the discharge means.

As illustrated in FIG. 6, which will be used to describe the components, the mixed feedstock solution is pumped to an area of the hopper separation means 1 referred to as the feed zone 70. The mixed feedstock solution enters the hopper separation means 1 through a feed line 3 at or very near the top level of the hopper separation means 1.

Depending on the specific application and whether there are more than one phase of material separation, the mixed feedstock solution can be dumped or dropped into the feed zone 70 of the hopper separation means 1 or it can be pumped such that the discharge into the hopper separation means 1 impacts a hood 4 or other surface, which is believed to further assist the mixing and material liberation process. This is shown more fully in FIG. 6, compared to FIG. 7 wherein the mixed feedstock solution is merely poured or dumped into the feed zone 70 of the hopper separation means 1.

The outer structure of the hopper separation means 1 is a typically configured hopper. However, there are important modifications thereto for the preferred practice of this invention. The hopper separation means 1 of this invention is open to the atmosphere at its upper end, thereby allowing use of a known pressure, i.e. atmospheric, as a point of reference at the top of the hopper separation means 1. The open top of the hopper separation means further eliminates the problems associated with enclosed systems in which air pockets and unwanted, unplanned pressure can build up and impede the performance of the system.

A feed zone 70 is created in this hopper separation means 1 by partitioning a portion of the hopper from the rest of the hopper by attaching a plate means to the inside of the outer walls of the hopper, configured and sloped as shown in FIGS. 6, 7 & 8. The partition is referred to as a feed zone partition wall 71. An opening is provided at the bottom of the feed zone partition wall 71 to allow the mixed feedstock solution to be pushed by the force of its own flow through the opening and into the main portion of the hopper separation means 1.

Once the system is operating, the mixed feedstock solution entering the main portion of the hopper separation means 1 immediately enters its first separation zone 6, wherein the less buoyant portion of material in the mixed feedstock solution descending through the opening between the outer wall and the feed zone 70 partition wall will immediately descend or settle through the static zone 8 as shown in FIG. 6, through the neck of the hopper separation means and into the separation chamber 10, as will be discussed more fully herein.

The static zone 8 in the hopper separation means 1 is created by forces and flows in the separation chamber 10 and the open nature of the upper end of the hopper separation means 1. There is virtually no upward motion of the separation fluid contained in the lower portion of the main area of the hopper separation means 1 during operation of the system, aptly named a static zone 8.

Separation fluid is fed from a clean water inlet 33 at the lower end of the third separation zone 9, with the head allowed to build in the second separation zone 7 until just below the overflow 2 height at the upper end of the hopper separation means 1. The flow rate in the separation chamber 10 is stabilized with the head remaining constant at this level. The fluid at the lower portion of the second separation zone 7 remains static until the mixed feedstock solution is introduced.

It is important that the static head level in the second separation zone 7 be established and maintained just below the overflow 2 prior to the introduction of the mixed feedstock solution. The ascending flow rate established in the third and fourth separation zones 30, is in direct relation to and dependent upon the fourth separation zones 30 discharge diameter and it's height in relation to the established static head in the second separation zone 7.

The flow rate in the material discharge line 32 from the bottom of the separation chamber 10 is likewise dependent on the diameter of the discharge line 32, and upon it's discharge height in relation to the established static head in the second separation zone 7, as shown in FIG. 6.

The flow of the mixed feedstock solution into the main portion of the hopper separation means 1, causes an ascending flow rate in the main portion of the hopper separation means 1 and an overflow 2 out of its open upper end as the static head tries to rise.

Due to the static head initially established in the second separation zone 7, the ascending flow rate in the second separation zone 7 is established by the flow rate and composition of the mixed feedstock solution.

In one application of the invention and as illustrated in FIG. 6, a plurality of sloped tubes 34 are included in the hopper separation means 1 to better facilitate the separation process. In conjunction with said plurality of sloped tubes 34, a gate means 35 can be used to assist in controlling the flow rate by partially or wholly blocking the overflow 2 from some or all of the tubes 34. In this application and based on the static head initially established in the second separation zone 7, the ascending flow rate in the second separation zone 7 is established by the flow of the mixed feedstock solution and can additionally be altered by the setting of the gate means 35 blocking the overflow 2 from the tubes 34.

The gate means 35 is a movable divider that is placed along the top of the tubes 34 extending above the level of the second separation zone 7 overflow 2, allowing placement at any desired point between the second separation zone 7 overflow 2 and feed zone 70 of the hopper separation means 1.

The gate means 35 allows control of the ascending flow rate of the mixed feedstock solution in the second separation zone 7. The ability to control the ascending flow rate of the mixed feedstock solution in the second separation zone 7 and the overflow rate, eliminates the need to adjust the flow rate of the mixed feedstock solution, though the desired solid particle size separation may vary. It further allows you to vary the flow rate of the mixed feedstock solution while maintaining the required ascending flow rate required for achieving the desired particle size separation.

It is preferred that the ascending flow rate in the second separation zone 7 be just slightly less than the optimum rate to make the desired initial separation of the solid particles, to assure that material greater than the predetermined optimum size is not removed with the overflow 2 discharged from the second separation zone 7. The comparably oversized or coarser material will generally settle faster, through the second separation zone 7 and into the separation chamber 10.

In the main portion of the hopper separation means 1, as one application is illustrated in FIG. 6, there is a mixed feedstock solution input line, a flow deflector means, a gate means 35 as described above and an overflow 2 means.

The second separation stage occurs in the main portion of the hopper separation means 1. While the upward flow created by the input flow of the mixed feedstock solution is occurring, the material contained therein with less buoyancy, depending on the flow rate, settles or descends downward into and through the static zone 8 portion of the second separation zone 7 and then into the separation chamber 10.

In the application of this invention wherein sloped tubes 34 are added to the hopper separation means 1 as illustrated in FIG. 6 and FIG. 7, the tubes 34 facilitate a more effective second separation stage based upon the laminar and turbulent flow characteristics through tubes 34 and due to the increased fluid flow boundary layer surface area.

The material descending from the second separation zone 7 during either the first separation stage or the second separation stage, descends or settles down through the static zone 8 and is thereafter fed into the separation chamber 10.

Examples of applications of the separation chamber 10 anticipated by this invention are shown in FIGS. 6, 7 and 8.

It is preferred that pure separation fluid is fed from the lower end of the separation chamber 10 to the third separation zone 9 and in turn removed therefrom in an at least equal amounts, removed with the settled particulate material exiting the bottom of the separation chamber 10 through a material discharge line 32 and with the other feedstock material discharged at the upper end of the separation chamber 10 through discharge line 31. The amount of separation fluid supplied at the lower end of the separation chamber 10 per unit time may be in excess of the amount of liquid which within the same unit time is branched off from the supplied stream of the separation fluid and then conducted to upwardly ascend through the separation zones.

FIGS. 6, 7 and 8, show general internal configurations of different applications of the separation chamber 10 contemplated by this invention.

As the descending feedstock enters the separation chamber 10, it enters what is referred to as the third separation zone 9. The third separation zone 9, a generally turbulent zone, is designed to effect a thorough mixing, distribution and/or dissolution of the feedstock material or parts of the feedstock in the separation fluid.

In some applications of the separation chamber 10, there are one or more deflection means 72 attached to the side wall and sloped toward and into the cross-sectional center of the separation chamber 10, whereas in other applications, there need not be any deflection means 72.

In the application of this invention wherein deflection means 72 are used, the operation of the third separation zone 9 prevents material from sliding down the walls of the separation zone through the use of the deflection means 72. The descending material moving along the 45 to 50 degree deflection means 72 in the third separation zone 9 in opposition to the ascending separation fluid creates a cyclone action and thereafter from the next deflection means 72, creates an anti-cyclone action. The more material that is flowing down the 45 to 50 degree deflection means 72, the greater the cyclone and anti-cyclone effect, which greatly assists in the separation of the solid particles and prevents the particles from sliding down the walls.

The third separation zone 9 also moves the separation fluid obliquely through the descending material while the ascending flow rate of the separation fluid separates the solid particles of a predetermined size, based upon the constant upward velocity in the separation chamber 10. This design, as compared to a vertical separation zone with a laminar flow, drastically increases the volume of material that can be processed in a given time, allows for a much shorter separation chamber 10, and makes a more precise split of materials of varying settling velocities, at a given ascending flow rate.

The fourth separation zone 30 is located above the third separation zone 9 in the separation chamber 10 and is intentionally designed as a vertical separation zone with a sufficient height to assure that the separation liquid has calmed down to achieve the desired smooth laminar flow. This tends to assure little or no loss of particles greater in size or weight than desired are lost through the discharge at the top of the fourth separation zone 30. Although the fourth separation zone 30 is referred to as a separation zone it is also a calming area from which the separated lighter particles are lifted or removed from the separation chamber 10.

The combination of remaining more buoyant feedstock material, with a minor amount of liquid that was not discharged in the second separation zone, is discharged through discharge line 31 for recirculation and re-use elsewhere in the system and as described more fully herein.

The material extracted or separated from the remaining feedstock, at the lower end of the separation chamber 10, is removed and transported through a material discharge line 32 with the use of a liquid medium, i.e. separation fluid.

The separated material can then be separated from the separation fluid by any one of several known means. Examples of separation means suitable for this are sieves, filters and classifying devices such as spiral classifiers, hydrocyclones and the like; nevertheless, the separation may be similarly effected in a settling tank of suitable dimensions.

FIG. 14 shows an example of one application of the system where certain types of particles, such as heavy metals, are to be separated. At the bottom end of the separation chamber 10 is a valve means 64, a container 66 and a means to remove and reinstall the container 66, referred to as item 65. Item 65 can be accomplished a number of ways, including by a camlock fitting for quick and easy removal.

When the container 66 is filled with the material to be separated, it is simply removed and replaced with another or the same container 66.

Figure 9:
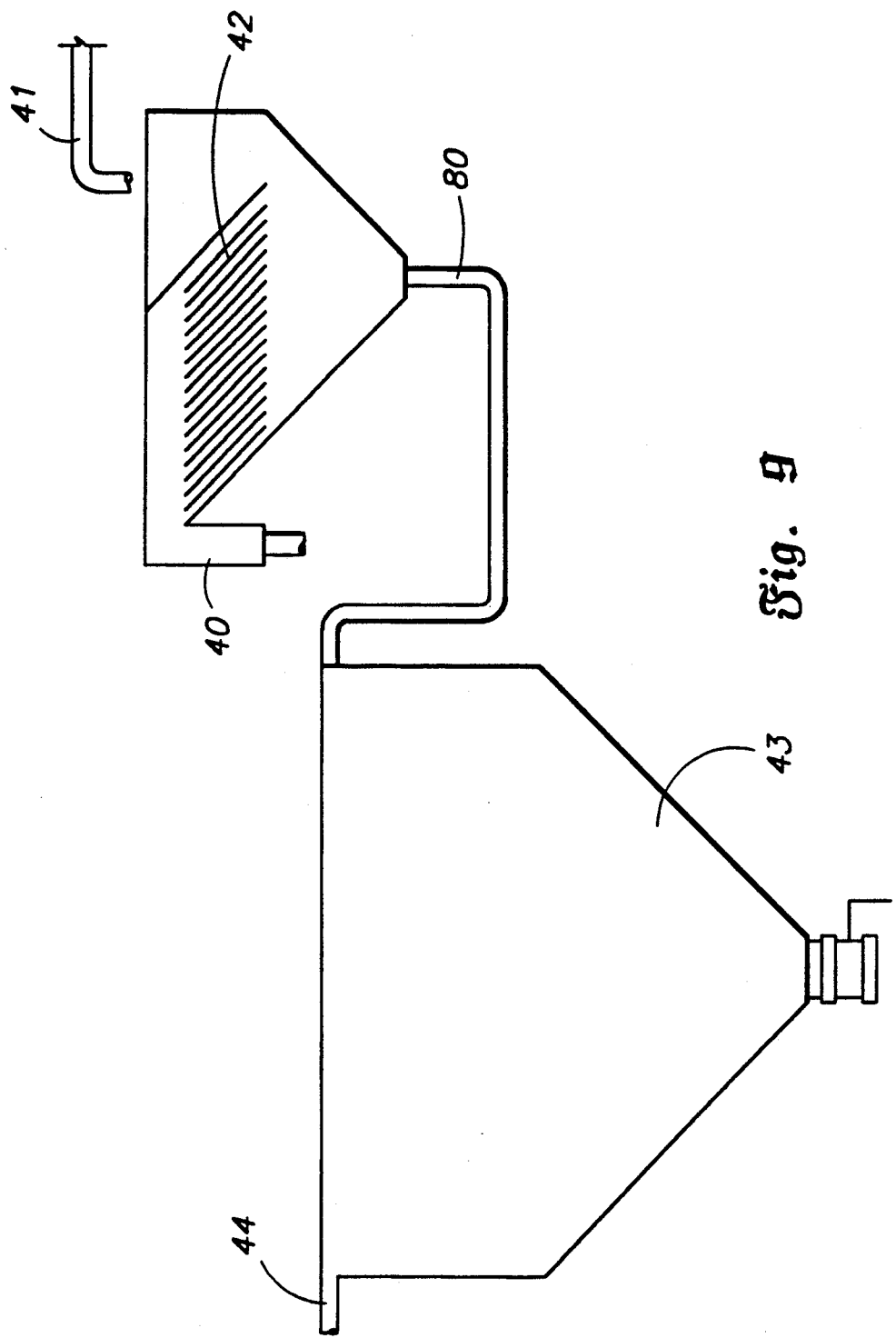
FIG. 9 shows an example of one application of the clarifier, shown in other figures.

FIG. 9 shows another example of how a mixture of separated material can be substantially separated from the separating fluid. FIG. 9 shows a clarifier configuration, and in which, item 41 is the input line wherein the mixture is deposited into the clarifier 23, a plurality of diagonally sloped tubes 42, an overflow discharge 40 through which the very near pure separation fluid is discharged and recirculated to the clean fluid tank 21, the piping means 80 to move material or solution to the second stage thereof, the optional storage or settling tank 43. The material enters the settling tank 43, wherein the solid material settles to the bottom of the tank and can then be appropriately discharged and the clean separation fluid is then discharged through discharge line 44 and back to the clean water tank 21.

Figure 12:
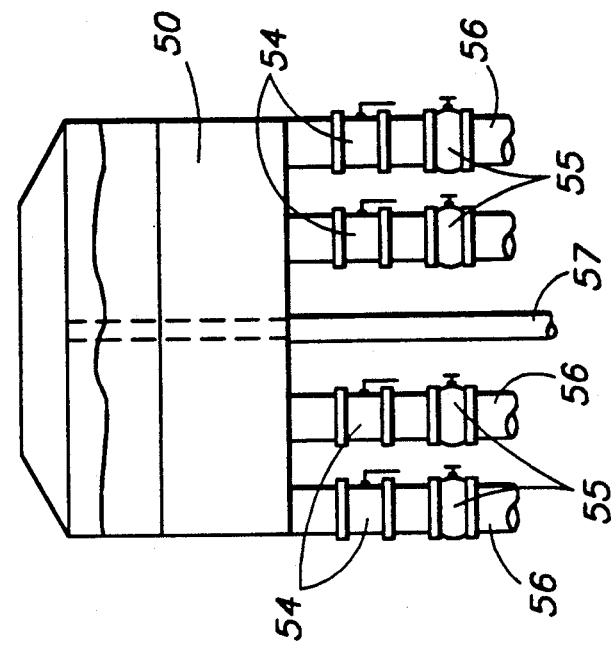
FIG. 12 is a side elevation view of one application of a clean water head control tank, as also shown in FIG. 11.
Figure 11:
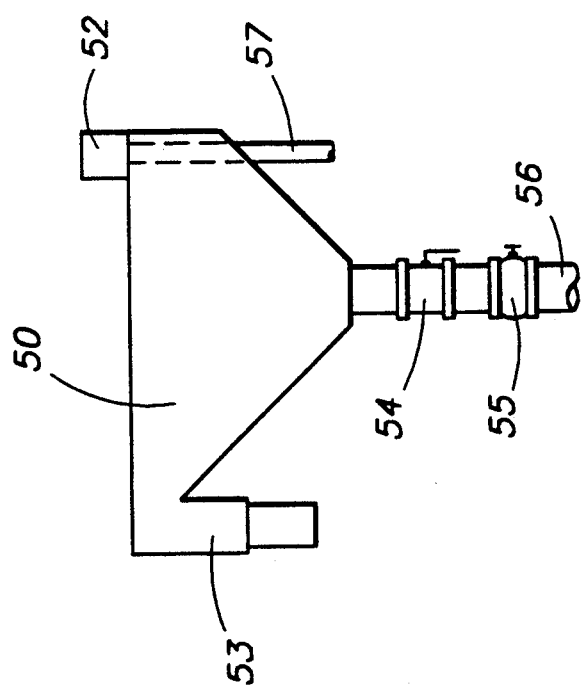
FIG. 11 is a front elevation view of one application of a clean water head control tank.

The resulting fluid stream separated from the material, as shown in FIG. 9, is then re-circulated for re-use in the system. In particular, this stream of clean separation fluid may once more and again be used as clean separation fluid and, via the clean fluid tank 21 and the clean fluid head control tank 50, as shown in FIGS. 11 & 12, can provided to the lower end of the separation chamber 10, to the drum classifier 18 or any other use. Independently thereof, part of said resulting separation fluid may also be put to some further use for other purposes, for example as wash fluid in other parts of the system.

The material that descends to the bottom of the separation chamber 10 is removed from the system by a discharge line 32 whereas the discharge line 32 lifts the clean material to a pre-determined height before being discharged from the line. The use of a pre-determined height allows the material to be fed to another embodiment of the system for further processing and/or dewatering. Further, the lifting of the material to a pre-determined height tends to keep the system flows, pressures and velocities in balance as the density in the second and third separation zone 9 builds from the addition of heavy solid particles.

The clean fluid head control means 50 receives the separation fluid from the fluid water tank 21 via the clean fluid pump 20. As shown in FIG. 11, the incoming clean fluid is received through piping 57, discharged against the hood means 52, wherein it fills the clean fluid control tank 50. The clean fluid control tank 50 is kept in a constant overflow condition and the overflow from the tank is discharged through discharge line 53 and back to the clean fluid tank 21.

Maintaining the clean fluid control tank 50 in constant overflow condition allows a head point of reference from which all the clean separating fluid can be provided through the appropriate valve means.

FIG. 12 shows a side view of the clean fluid control tank 50 shown in FIG. 11, and also shows the valve means used to distribute and balance the clean separation fluid to the various components and processes of the system. Although four output piping means 56, with valves, are shown in FIG. 12, there can be any number thereof, depending on the needs of the specific application of the invention.

The input line 57 to the clean fluid control tank 50 delivers the clean fluid to the tank 50. The output piping means 56 generally each have a gate valve 55 and an on-off valve such as a quarter turn valve 54. Upon initial balancing of the system, the quarter turn valves 54 are fully opened and the system is balance by adjusting the gate valves 55. Once the desired settings are reached for the gate valves 55 for any given application, they are left alone and the quarter turn valves 54 are used on startup and shutdown of the system, thereby eliminating the need to re-adjust them.

The clean fluid control means configuration and system shown in FIGS. 11 and 12 allow the use of gravity and a head point of reference for the system distribution of the clean fluid and allow the use of one clean fluid pump 20 to feed all the components of the system utilizing clean fluid.

In the application shown in FIG. 12, one of the discharge lines 56 may go to the drum classifier 18, one to a first separation chamber 10, the third line to a second separation chamber 13 and the fourth to any other use.

The amount of mixed feedstock solution comprising an amount of feedstock discharged from the fourth separation zone 30 can be adjusted to produce and maintain a controlled flow rate of the separation fluid ascending in the third and fourth separation zone 30. As has been set forth hereinabove, care is to be taken that the fourth separation zone 30 may of a substantially laminar flow.

The controllability of the process according to the invention will be clear from a view at the cooperation of the three functional members of the separation device according to the invention, namely the second separation zone 7, the third separation zone 9 and the fourth separation zone 30.

It should be further noted that in this embodiment of the invention, the amount of feedstock and/or liquid in the mixed feedstock solution provided to the feed zone 70 in the hopper separation means 1, can vary and is adjustable without effecting the ascending flow rates established in the third and fourth separation zones 30, nor does it effect the flow rate established in the clean material discharge line, and/or the static water area established between the third separation zone 9 and the second separation zone 7.

It should be further noted that in this embodiment of the invention all flow rates can easily be adjusted to allow for a variety of embodiments to be employed.

As will be described hereinbelow in greater detail, important embodiments will be adapted to suit special preparations of the feedstock, wherein said feedstock has been preconditioned with auxiliary fluids and is introduced into the second separation zone 7 together with said auxiliary fluids. The auxiliary fluid employed here may be identical with or different from the separation fluid. In the latter case, however, it is contemplated in preferred embodiments that the auxiliary fluid and the separation fluid are capable of being intimately mixed with each other and, possibly, may even be soluble in each other. The term "miscibility" is understood to include the particular case in which the auxiliary fluid or a portion thereof is emulsifiable in the separation fluid, so that the process according to the invention may be contained with a homogeneous mixed feedstock solution or a mixed feedstock solution of uniform appearance.

In the process according to the invention, water or aqueous solutions of inorganic and/or organic components are of particular importance as the separation fluid. In view of the broad range of application of the process according to the invention it goes without saying that the scope of the invention is not limited thereto. Nevertheless, water is the preferred embodiment for processing and decontamination of soil, as particularly featured for illustrating the principles according to the invention. For controlling the sedimentation properties it may be expedient that the aqueous phase is loaded with a weighing agent comprising a solution of inorganic and/or organic salts and comparable components. Such additional measures are usually not required in the soil decontamination as illustrated by the example set forth hereinbelow.

Auxiliary fluids may have a special part in pre-conditioning the feedstock to be separated and/or decontaminated. Such pre-treatment may serve various purposes and may be effected in one step or in a procedure comprising several steps. The pre-conditioning stage frequently serves to mobilize impurities and noxious materials as chemically and/or physically attached to the particles of the feedstock in order to facilitate the purification of the latter.

An auxiliary fluid may be used, for example, to reduce the tendency for dust formation of the feedstock to be processed. This aspect is of particular significance, e.g., in the treatment of soil contaminated with radioactivity.

As another example, the concomitant use of auxiliary liquids during the introduction of the feedstock into the washing plant mixing zone 45 will serve to facilitate mixing the feedstock with the separation fluid and/or to ensure that all of the components of the feedstock will be rapidly distributed in said mixed feedstock solution.

The intention of this measure will be immediately evident from the following example: If soil contaminated with oil is to be subjected to the decontamination process of the present invention, the successful and reliable separation of the oil phase and the soil constituents stuck together by the sparingly mobile oil phase will only be accomplished, if the oil-contaminated soil feedstock will have been pre-conditioned with an auxiliary fluid, in particular an aqueous fluid containing one or more surfactant(s), and/or water-soluble solvents to such a degree that a separation of all of the components of the feedstock mixture in the mixed feedstock solution containing the separation fluid can be ensured within the residence times of the feedstock mixtures in the washing plant mixing zone 45, scrubbing zone 47, and in the subsequent separation zones. It is rather appropriate that in the step of pre-conditioning the feedstock to be separated will be made into a slurry with the auxiliary liquid and, if so desired, with the chemicals concomitantly used, or even will be suspended in an accordingly larger amount of said liquid auxiliary component. The duration of the pre-conditioning procedure is selected so that the desired result of the distributability and/or miscibility in the separation fluid will be safely achieved. In the course of this pre-conditioning procedure, portions of the feedstock to be purified may be dissolved and/or emulsified in the auxiliary fluid. The liquid/solid composition-of-matter thus prepared may then be supplied to the second separation zone 7. Due to the turbulent working condition of the third separation zone 9, the conditions are realized which enable a sufficient fractionation or partitioning into the different material portions to be effected within the short residence time in the separation device.

The preferred auxiliary liquid for conditioning the feedstock wholly or partially consist of the separation fluid or predominantly consist thereof. Water-based mixed feedstock solutions are particularly suitable as auxiliary fluids; said water-based mixed feedstock solutions may contain any chemicals required as auxiliary and/or valuable products that have been added thereto, in coordination with the chemical and/or physicochemical processes as desired and/or required for pre-conditioning the feedstock.

One particular advantage of the process according to the invention resides in the fact that an efficient separation of material is achievable in a single process run through the four separation zones. The reason is that the process according to the invention may be controlled by the appropriate coordination of the supply of feedstock and optionally auxiliary fluid, on the one hand, and withdrawal of loaded mixed feedstock solution at the head of the second separation zone 7, on the other hand, in combination with the control of the flow velocity of the separation fluid in the separation zones.

Figure 13:
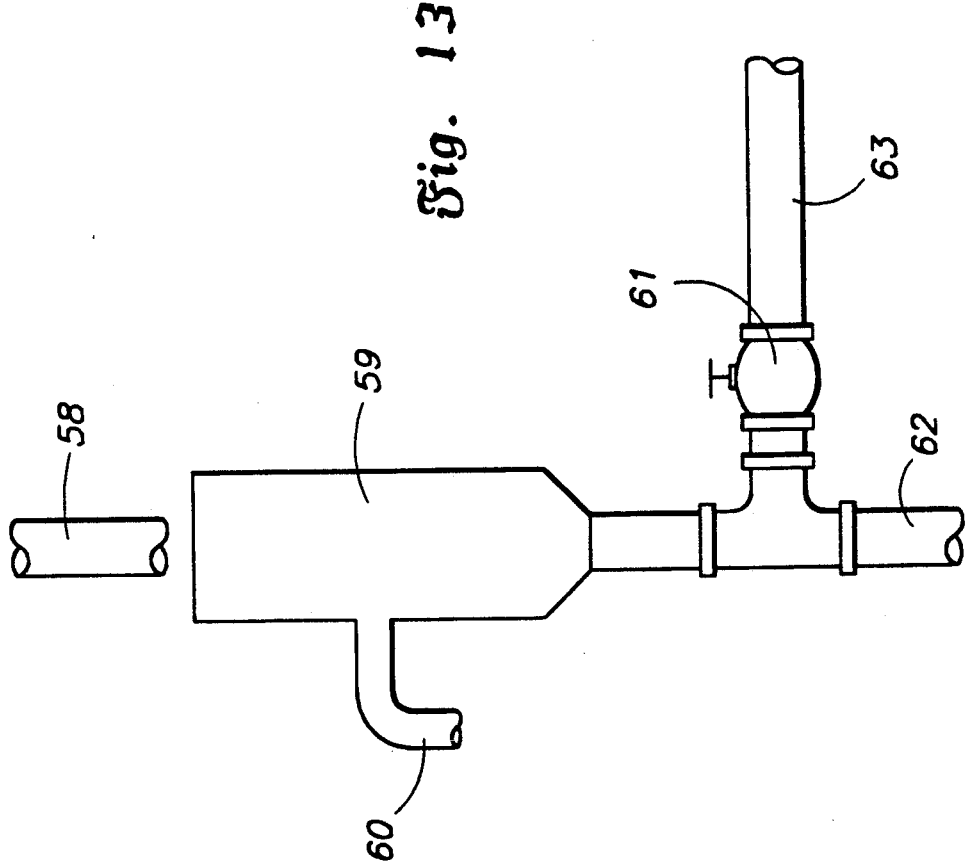
FIG. 13 shows one application of the waste slurry control valve and piping system of the invention.

The control of the distribution of the discharges from the separation chambers 10 is accomplished by a means shown in FIG. 13. FIG. 13 receives all the discharge from the separation chambers 10 and the overflow 2 of the hopper separation means 1 and controls the distribution of the flow. The input line 58 to the control receives the discharged material and it enters a standpipe 59. Some of the discharged material is distributed to the waste slurry through line 60, while the remaining portion proceeds to either the dirty separation fluid recirculation to the washing plant means 13 via line 62 or to the drum classifier 18 via line 63 and is controlled by gate valve 61. It should be noted that line 62 in FIG. 13 is the same as line 46 in FIG. 10.

For the system operator, it is a simple matter of making an adjustment with the one gate valve 61, to control the movement of waste through the system. By maintaining a constant level in the slurry hopper 12 with the adjustment of this gate valve 61, the system will remain in balance.

Assume an application with one separation chamber 10 is being used. The overflow from the feedstock material being pumped to the top of the separation chamber along with the separating fluid being discharged from the fourth separating zone is directed to the standpipe 59 through line 58. The bottom discharge line 62 is the liquid feed line to the front of the washing plant means 13 as the liquid mix for the incoming feedstock.

The flow rate is controlled by a fixed diameter discharge on the end of the feed line 58. And the flow rate is in direct relation to the height of the liquid level at the overflow line in the standpipe 59, which will remain constant.

Assume that the gate valve 61 is closed, and a ten gpm flow rate is desired to the front of the washing plant means 13 through line 62. A $\frac{1}{2}"$ diameter on the line four feet below the overflow at line 60 will give you approximately a ten gpm flow rate (discounting friction loss or density buildup in the flowing liquid). Assume that you are flowing fifty gpm from line 58 into the standpipe 59. With the gate valve 61 closed and a flow rate of ten gpm through line 62, you will have forty gpm overflowing at 60, the diameter of which is large enough to handle the overflow without the head rising in the standpipe 59. This constant head maintains control of the flow rate to the front of the washing plant means 13 through line 62.

Assume ten gpm of clean separating fluid is pumped through the separation chamber 10 being discharged from a fourth separation zone 30. Five gpm is supplied to a clean water spray bar. And you are removing five gpm moisture content from the feedstock from moisture contained in the soil. You are pumping forty gpm to the top of the separation chamber, which is overflowing the top of the hopper separation means 1 and being directed through line 58 to the standpipe 59. If you open the gate valve 61 and maintain a balanced level in the slurry hopper 12, you will be discharging twenty gpm to waste from line 60, the five gpm from the liquid contained in the feedstock, five gpm from the clean water spray bar, and the ten gpm from the fourth separation zone 30. If it is known that ten gpm are flowing from the separation chamber and five gallons per minute through the clean water spray bar, the excess five gpm are therefore coming from the moisture content contained in the feedstock prior to being fed into the system.

On start-up, when you start pumping water from the slurry hopper 12 to the top of the hopper separation means 1, all of the water will overflow to the standpipe 59. With the gate valve 61 open, you will not be discharging any liquids to waste. The level of the slurry hopper 12 will rise at the rate of five gpm. Upon start up, you should start with the liquid level in the hopper low enough to assure that you start receiving solids from the washing plant that you can recycle through the plant, until which time you approach the desired material versus liquid in your waste stream. At this time, you will now start closing the gate valve until you maintain a level in the hopper, and you will then be discharging the exact amount of liquids entering the system from an outside source.

If the fines from the feedstock that you want to remove as waste exceeds the 50:50 desired ratio for discharge from the overflow at 60, you simple increase the water supplied from the clean water spray bar to establish and maintain the desired ratio of solids versus liquids being discharged from the system.

An example of this is as follows: Assume that you are feeding the system 100 percent fines that you are going to remove as waste. Once you reach approximately 4½ yards of feedstock per hour, you will reach a 50/50 ratio of solids versus material in your waste stream. 4.5 cubic yards per hour is equal to approximately fifteen gpm (with 0 moisture content). If you are discharging ten gpm from the third separation chamber and five gpm from the clean separating fluid spray bar, you will have the desired 50/50 split, material versus water by volume.

If you wanted to double the feed rate of the feedstock to nine cubic yards per hour, you would simple increase the clean water spray bar from five gpm to twenty gpm. This will give you a thirty gpm liquid discharge rate to match the thirty gpm solids rate (nine yards an hour at two hundred and two gallons per yard = thirty gpm material solids entering and leaving the system by way of the waste discharge line).

The foregoing is an example of the operation of the system through the control and distribution of the discharged material from the hopper separation means 1 and from the separation chamber 10.

Another important embodiment of the process and apparatus according to this invention, is a multistage process in an apparatus comprising a cascade-like arrangement of two or more separation chambers 10. It is preferred that the mixed phase withdrawn from the upper end of the fourth separation zone 30 of the first separation device be supplied as the feedstock to a second separation device, and so on, as needed for the separation application.

It has been found that a very fine fractionation is possible of just the finest portions of a particulate solid material having a particle size in the range of clearly below 1 mm (millimeters). Thus, for example the reliable separation of material with pre-determined values of the particle diameters within the range of from about 30 microns to about 800 microns, and preferably within the range of from about 40 microns to about 600 microns, has been successfully accomplished. For the purpose of a large-scale operation in practice, from two to three separation stages according to the invention in a consecutive cascade arrangement will in general be sufficient for achieving highly efficient separations to yield highly purified products. However, a single separation system as described herein is also very efficient and effective for many separations.

Nevertheless, independently of this option for controlling the result of the fractionation, there is the other possibility as already mentioned above of controlling the operation conditions within only one separation device, thereby effectively to control the result of the separation.

The teaching of the invention further contemplates that the pre-conditioning of the feedstock and/or the further processing of the separation products of the process according to the invention is/are effected in combination with per se known additional working steps for the preparation and, more particularly, separation of an unlimited number of material mixtures.

The portions of matter withdrawn at the head of the fourth separation zone 30 may be subjected to any further conventional separation procedure. For example, this portion containing finely divided solids of the mixed feedstock solution may be subjected to filtration, pressing or simply allowing to settle. The portions recoverable thereby of the mixed feedstock solution may be re-used.

This invention may also be used to re-condition the mixed feedstock solution withdrawn at the top of the fourth separation zone 30 in order to facilitate a removal of the fine solids contained therein by phase separation. Thus, for example, it has been known that the surfactant properties of selected surfactants can be controlled by regulating and adjusting the pH value thereof. For example, in pre-conditioning a feedstock contaminated with oil or chemicals, the aqueous auxiliary fluid is adjusted to a pH value where the surfactant will display its full activity. Then, once this aqueous surfactant-containing fluid phase has been withdrawn from the fourth separation zone 30, the surfactant activity may be destroyed or at least reduced to facilitate a phase separation in this partial stream.

The process according to the invention is particularly well suited for the treatment of feedstock materials which, due to their nature, permit sufficient differentiation between the two product fractions, i.e. the bottom fraction from the third separation zone 9 and the head fraction from the fourth separation zone 30. The advantages attainable with the process according to the invention are obvious: Soil materials contaminated with radioactivity, to a considerable degree usually contain most, or the great majority, of the radioactive contaminates in the fines thereof, i.e. in particle fractions having average particle diameters of not more than about 150 mesh (about 100 microns) and less. By means of the process according to the invention, the decontamination of such soil contaminated with radioactive substances is successfully accomplished by removal of the fines. Recovery of substantially all of the fines (i.e. particles having less than the predetermined separation size) with the top fraction means that the heavier particles recovered from the bottom are substantially free of radioactivity.

With a suitable pre-conditioning it is also possible to remove particularly hazardous poisonous pollutions, for example those based on pesticides, halogenated cyclic hydrocarbons such as dioxines and related halogenated polycyclic compounds and/or tetrahydrofurance compounds. Further for example, by way of the addition of chelate-forming agents in the pre-conditioning step, of withdrawing undesirable amounts of heavy metals together with the mixed feedstock solution from the upper end of the fourth separation zone 30 and the overflow 2 of the second separation zone 7, so that a cleaned residual soil material can be separated and re-used.

Details on suitable concrete auxiliary agents and means in a particular case and further information literature references are found, for example, in the publication "EPA/600/2-89/034" quoted hereinabove. Thus, for example, the following is applicable:

In water washing with extraction agents the washing solution can be basic aqueous solutions (caustic, lime, slaked lime, or industrial alkali-based washing compounds); acidic aqueous solutions (sulfuric, hydrochloric, nitric, phosphoric, or carbonic acids); or solutions with surfactant or chelating agents.

Hydrogen peroxide, sodium hypochlorite, and other oxidizing agents are also used to chemically change the contaminants. A strong (highly ionized) basic or surfactant solution can be used for some organic extraction, and strong (highly ionized) acidic or chelating agent solutions can be used for metal extraction. The surfactant and chelating solutions have a moderate (almost neutral) pH, making equipment metallurgy simpler, and operation safer. The successful development of means to clean soil with surfactants and chelating agents is important because often soil is contaminated with organics and heavy metals.

Further details relating to an optimum adjustment of the working conditions in a pre-conditioning procedure are found, for example, in the report quoted hereinabove, "EPA/600/2-89/034" pages 24–32 incorporated here by reference.

The flow rate and/or the residence time of the liquid portions in each of the four separation zones of the invention may be controlled or varied, for example, by the cross section of the respective zone, the length in flow direction of the respective zone, and/or the operative conditions with respect to the feed and discharge of the mixed feedstock solutions utilized in the process. The lengths as well as the cross sections of the individual zones of operation may be the same or different. Thereby, the residence times of the material being in a continuous upward motion and/or of the liquid/solid material in turbulent motion in the zone of turbulent flow can be efficiently controlled and adjusted. For example, it may be desirable to adjust a higher residence time of the material stream in the third separation zone 9 in order to ensure a complete and uniform distribution of the remaining feedstock solution. The respective flow velocities in the corresponding third and fourth separation zones 30 may also be adjusted to different values.

The preferred aspect as already emphasized of the process according to the invention in that the mixed feedstock solutions are appropriately recycled, so that the operation may be conducted with a minimum input of continuously supplied separation fluid and/or auxiliary fluid. This may be evident from what follows:

The fluid stream withdrawn from the bottom of the separation chamber 10 is subjected to a solid/liquid separation, and the resultant components are then recycled, re-used or re-routed.

Further partial streams may be diverted from K and I of the second and fourth separation zones 30. Herein exemplified are partial streams of the fluid phases load with solids which may be used to serve various purposes within the scheme of the entire process. In an important embodiment of the invention, the process described can be modified as follows:

The contaminated material to be separated, for example, a slurry of fines, sand and pebbles enters the feed zone 70 at the top of the hopper separation means 1. Very fine particles are maintained in suspension by an upward flow of water through the second separation zone 7. This suspension is discharged by overflow 2 at the top of the second separation zone 7. This material solution can be fed to a clarifier 23 for further concentration of the fines and recovery of the water for recycling or can be used or disposed of in other ways. The denser particles settle to the static area of the second separation zone 7, where they encounter a higher velocity stream of upflowing separation fluid. By entering the third separation zone 9, it forms a further turbulent zone. The largest and densest particles that enter this stream have a settling velocity greater than the velocity of the separation fluid and, therefore, descend to the bottom of the separation chamber 10. The settled material is subsequently separated from the liquid medium using for an example a spiral classifier. The intermediate fines taken off at the top of the fourth separation zone 30 above the turbulent zone may be taken to any further treatment desired or recycled.

The amount of effluent liquid finally discharged together with the waste to be disposed of from the circulation system may further be effectively controlled by known measures such as the use of flocculants, membrane processes, pond settling or other conventional separation methods.

Figure 5:
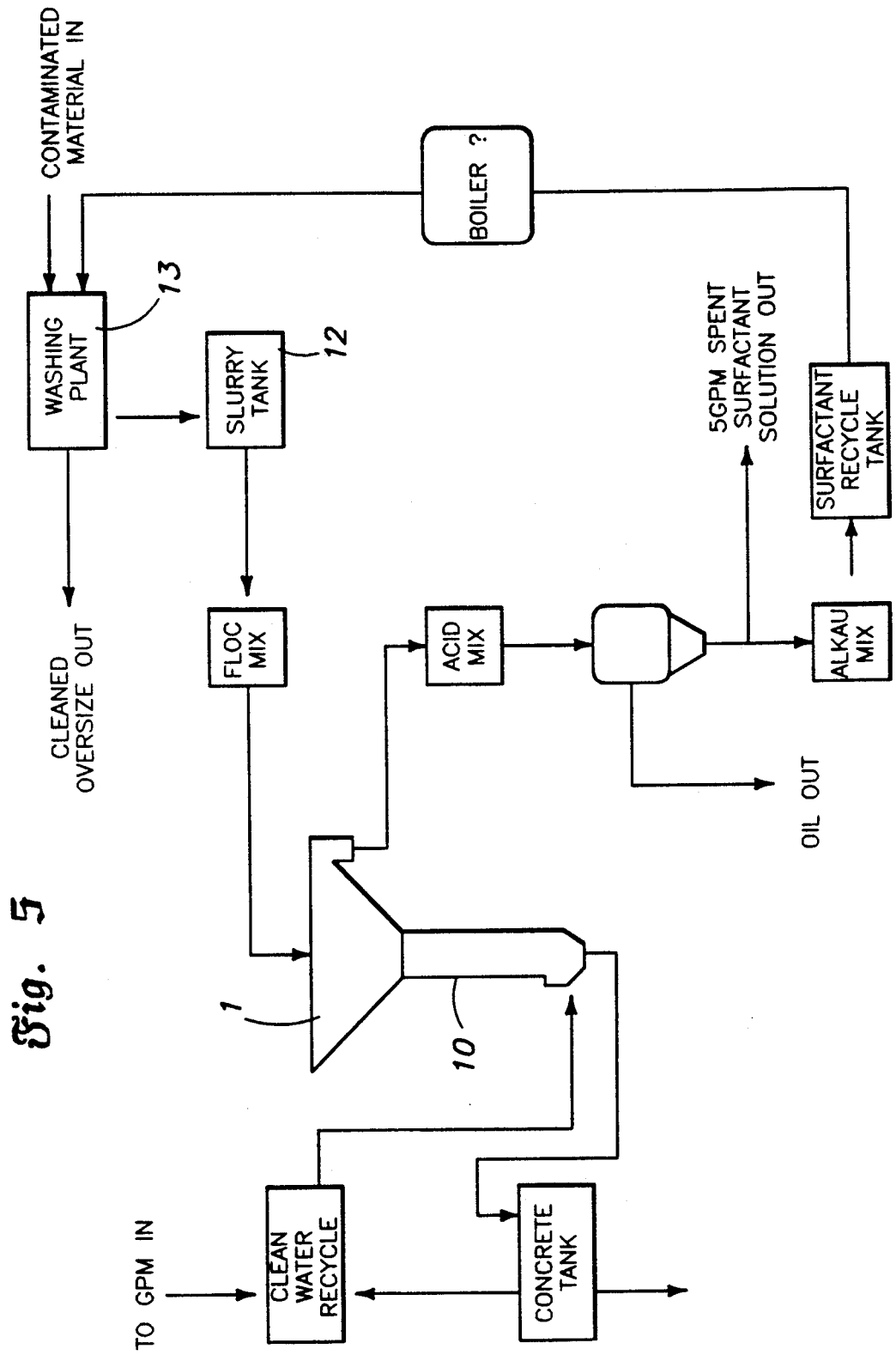
FIG. 5 is a flow diagram showing a plant layout for one example of this invention for processing hydrocarbon contaminated soil.

FIG. 5 shows a flow diagram for the decontamination of hydrocarbon-contaminated soil employed as the feedstock in the process according to the invention. In the process illustrated by FIG. 5, the contaminated material is subjected to pre-conditioning. The feedstock is first washed in a washing plant means 13 with an alkaline surfactant solution, and then exposed to a flocculation mix. The solids settle in the separation chamber 10 with the liquids being discharged from the head of the separation device. The surfactant action is then terminated by acidification, so that a separation of the oil phase becomes possible. A partial re-use of the aqueous surfactant solution for conditioning further portions of the contaminated feedstock is made possible by way of a subsequent alkalization.

The present invention is further illustrated by the following non-limitative example, wherein the separation of a sand mixture is described with the removal of particles having diameters of minus 150 mesh (up to about 100 microns) at a bulk feed rate (flow rate) of about 10 tons per hour (t/h).

EXAMPLE

The example given herein refers to a process description based on operating a test plant for a 150 mesh (99 micron) split at a bulk feed rate of ten tons per hour (10 t/h) and to the test results obtained.

Figure 2:
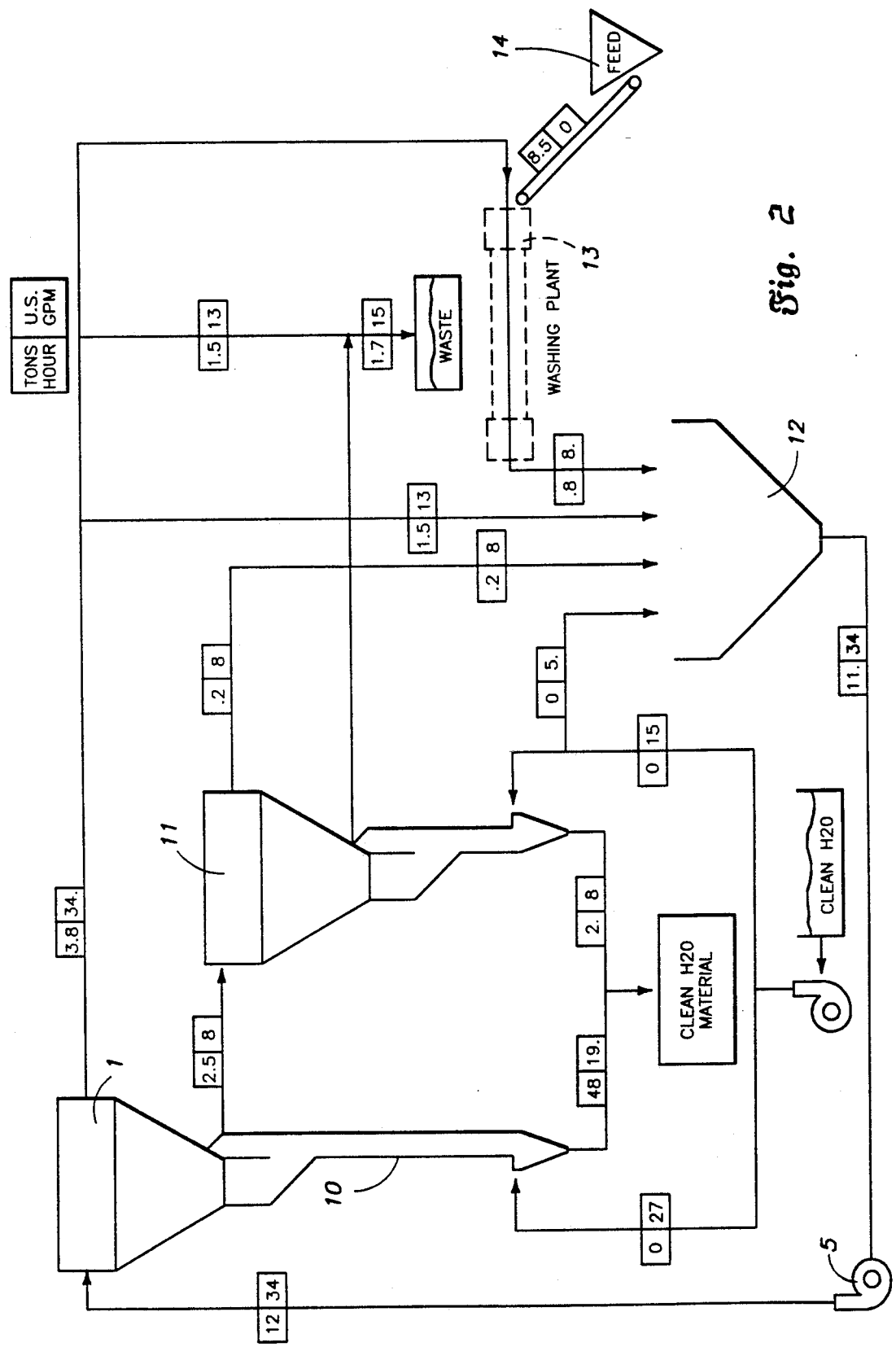
FIG. 2 is a schematic of one example of the flow of material in a two stage application of the invention.

The separation of the materials was carried out in a cascade apparatus comprising two separation chambers 10 as employed according to the invention and as shown in the FIGS. 1 and 2. The procedure was as follows:

Process Description

The bulk feed is dumped into a hopper A where it is fed into the washing plant B by way of a variable speed belt feeder 200. The material is agitated and washed continuously the length of the washing plant in order to insure that all of the fines will be separated from the bulk material. In the drum classifier 18, the material travels over a quarter inch (6.35 mm) screen. The plus fraction exits the drum classifier 18 via a conveyor belt to the cleaned material pile, while the water and minus fraction enters the slurry tank 12.

The slurry is pumped into the hopper separation means 1, where the material is separated and the cleaned quarter inch to 30 mesh (6.35 mm to 0.59 mm) material exits to the spiral classifier for de-watering and removal as cleaned material. A portion of the slurry recirculates back to the washing plant means 13 to aid in scrubbing the fines off the new incoming feedstock.

The minus 30 mesh (<99 micron) split of waste material flows through a chemical mixing chamber where a biodegradable flocculate (not shown) is added to accelerate the settling of suspended solids. The waste stream flows into a clarifier 23 that drains into an 800 gallon waste tank filled with water. The solids and flocculated material settle to the bottom of the tank, displacing the clean water back into the plant. With a bulk feed containing 3.5% fines, it will take a full shift to fill one tank. The system is completely closed, with no unconfined waste.

Test Procedure

Samples were taken from six points while the plant was in operation. The sampled material was screened down to 200 mesh (74 micron), and the remaining gradation through 635 mesh was determined by the hydrometer method.

Sample #1 was of the bulk feed, and the results thereof indicate that between three and four percent of the material was minus 150 mesh (99 micron).

Sample #2 was of clean de-watered material being discharged from the plant. The clean material includes the plus quarter inch (>6.35 mm) material discharged out of the drum classifier 18 and the de-watered material from the spiral classifier. The significance of this test was two-fold: to confirm that the bulk feed in the washing plant and drum classifier 18 was subject to sufficient washing and agitation, and that the separation chambers 10 were properly discharging quarter inch to plus 150 mesh (6.35 mm to >0.099 mm) cleaned material into the spiral classifier.

Sample #3 was of material being discharged into the spiral classifier from the primary separation chamber 10. This was a check sample to determine that the primary was functioning properly and minus 150 mesh (<99 micron) was not leaving with the cleaned fractions.

Sample #4 was taken from the secondary chamber discharging into the spiral classifier. This test was also to check that the secondary was properly splitting and discharging minus 30 mesh to plus 150 mesh (<0.59 mm to >0.099 mm) material and none of the smaller waste fractions.

Sample #5 was of separated material from the primary separation chamber 10 flowing into the secondary. This was a check sample to see if all of the plus 30 mesh material was being discharged into the spiral classifier.

Sample #6 was of the overflow 2 from the secondary containing the fines flowing into the drum classifier 18.

Sieve analysis and Mechanical analysis were performed in accordance with ASTM C-136 and ASTM D422 & and D1140, respectively. The test results were as follows:

Test Results

| Screen or Sieve size | Bulkfeed | Clean Material | Bottom 1 |
|---|---|---|---|
|  | | Percent Passing | |
| 3" | 100 | | |
| 2" | 96 | 100 | |
| 1½" | 90 | 93 | |
| 1" | 74 | 69 | |
| ¾" | 62 | 55 | |
| ½" | 39 | 39 | |
| ¼" | 42 | 31 | 100 |
| No. 4 | 29 | 17 | 71 |
| No. 10 | 20 | 7 | 31 |
| No. 20 | 16 | 3 | 8 |
| No. 40 | 11 | 0.5 | 1 |
| No. 80 | 4 | 0.1 | 0.2 |
| No. 200 | 3.0 | | |
| No. 270 | 2.2 | | |
| No. 400 | 1.9 | | |
| No. 635 | 1.6 | | |

| Screen or Sieve size | Bottom 2 | Top 1 | Top 2 |
|---|---|---|---|
| | Percent Passing | | |
| No. 4 | 100 | 100 | |
| No. 10 | 95 | 100 | |
| No. 20 | 84 | 100 | |
| No. 40 | 33 | 84 | |
| No. 80 | 1 | 39 | 100 |
| No. 200 74 um | 0.3 | 27 | 99 |
| No. 270 | 0 | 20 | 97 |
| No. 400 37 um | 18 | 84 | |
| No. 635 | 15 | 62 | |

Discussion of the Test Results

As a first essential result, the testing could not detect any of the minus 150 fraction leaving the plant in the cleaned material.

The total amount of waste material generated in order to achieve a 100% removal of the desired fines was analyzed and determined to be approximately 6.8% of the bulk feed.

It could be ascertained that this was not the achievable minimum level. Upon some reconfiguration of the plant, running the same material gave a result where the total amount of material going to waste was reduced to about 4% of the bulk feed without losing any of the minus 150 mesh in the clean material.

Nomenclature FIGS. 1 and 2:
Feed Rate 5 cubic y/hr. −¼" represents 10 cubic y/hr. bulk feed
Waste 10% of bulk feed
Specific Gravity 2.02 loose-3400 lbs. cubic yard.
−¼" represents 50% of bulk feed
Tons/hr.=8.5−¼"

| Total to Waste | 3,400 lbs. solids |
| --- | --- |
| | 7,506 added water |
| | 10,906 |

10,906 lbs. = a 68% reduction in bulk feed rate

Moisture Content of material "O"

While the preferred embodiment for the invention has been described in detail, those familiar with the art to which this invention relates will recognize various alternative designs and embodiments for carrying out the invention, as defined by the claims which follow.

The invention claimed is:

1. A process for the separation of materials, which is comprised of the following steps:
   a. mixing feedstock material with a composition comprised of a separation fluid and a portion of feedstock material previously through this process, resulting in a mixed feedstock solution;
   b. depositing the mixed feedstock solution into a hopper separation means wherein:
      i. a less buoyant portion of the mixed feedstock solution immediately descends through relatively static separation fluid, referred to as a first separation zone;
      ii. a more buoyant portion of the mixed feedstock solution is pushed upward by incoming mixed feedstock solution, referred to as a second separation zone, wherein:
         (1) a more buoyant and a liquid portion of the mixed feedstock solution are discharged above and a portion is recirculated to the first mixing step stated above; and
         (2) a less buoyant portion of the mixed feedstock solution descends through relatively static water and into a separation chamber and third separation zone;
   c. the feedstock solution descending to the third separation zone encounter the separation fluid moving upward at a pre-determined velocity, but in a substantially turbulent flow, calibrated to separate materials above a pre-specified settling velocity, and in which:
      i. a portion of the remaining feedstock solution with a settling velocity greater than the upward velocity of the separation fluid, descends to the bottom of the separation chamber and is removed as separated material;
      ii. whereas the portion of the feedstock solution entering the separation chamber with a settling velocity less than the separation fluid velocity in the separation chamber are carried by the separation fluid upward to a fourth separation zone, wherein the upward flow of the separation fluid and feedstock solution is substantially laminar and an additional and finer separation occurs, and a portion of the more buoyant material and liquid being discharged at the upper end thereof is recirculated to the first step stated herein.

2. A process for the separation of materials as recited in claim 1, and in which the portion of the remaining feedstock solution entering the third separation stage and with a settling velocity greater than the upward velocity of the separation fluid, descends to the bottom of the separation chamber, passing over one or more deflection means in its descent, which deflection means are sloped downward and inward from interior walls of the separation chamber such that material with a settling velocity lower than that of the separation fluid is prevented from descending along a side wall of the separation chamber.

3. A process for the separation of materials as recited in claim 1, and in which the more buoyant portion of the mixed feedstock solution entering the first separation zone within the hopper separation means, is pushed upward through a plurality of sloped tubes which better facilitate descent of a less buoyant portion of the mixed feedstock solution, a second separation zone.

4. An apparatus for the separation of materials, which is comprised of:
   a. a closed washing plant means which receives the feedstock, mixes it with a combination of discharged feedstock material from continuous operation and a separation fluid, thereby creating a mixed feedstock solution;
   b. a slurry hopper which receives the mixed feedstock solution from the washing plant means and retains it until it is pumped to a hopper separation means by a first pump means;
   c. the hopper separation means is comprised of:
      i. inwardly sloped outer containment walls configured such that the cross-section of the hopper separation means reduces in diameter with lower elevations;
      ii. an internal, sloped feed zone partition wall attached to said outer containment walls and which partitions a feed zone within the hopper separation means, which receives the mixed feedstock solution, with the deflection wall means and the adjacent containment wall facilitating the descent of the mixed feedstock solution into a main area of the hopper separation means;
      iii. a bottom opening which receives the descending less buoyant material from the mixed feedstock solution and facilitates its descent to a separation chamber;
      iv. an overflow and discharge means which receives the more buoyant material and liquid as it overflows the main area of the hopper separation means and recirculates it back to the washing plant means;
   d. said separation chamber being of constant cross-section through its height, and comprised of: an inlet from the hopper separation means near its upper end; a separation fluid inlet at its lower end, providing the upward flow of separating fluid; a first discharge means at its upper end which receives the more buoyant material of the remaining mixed feedstock solution combined with separation fluid, and recirculates it back to the washing plant means; and a second discharge means at its lower end which receives the less buoyant material and facilitates its removal.

5. An apparatus for the separation of materials as recited in claim 4 wherein the hopper separation means is further comprised of a plurality of sloped separation tubes with top ends which are located near the upper end of the hopper separation means and with lower ends which are located in an intermediate elevational position in said hopper separation means.

6. An apparatus for the separation of differing materials as recited in claim 5, wherein the hopper separation means is further comprised of a gate means which attaches to the outer containment walls of said hopper separation means along the top of the sloped separation tubes, and extending above the level of the hopper separation means overflow level, and which can be placed at any desired point between the second separation zone overflow and the feed zone to block the flow of material through some or all of the plurality of sloped separation tubes into the overflow and discharge means.

7. An apparatus for the separation of materials as recited in claim 4, wherein the first discharge means at the upper end of the separation chamber which receives the more buoyant material of the feedstock solution, is discharged to a second separation chamber for further separation similar to that in the first separation chamber.

8. An apparatus for the separation of materials as recited in claim 4, and which further comprises:
   a. a means to receive and remove the separating fluid from the separated material and separation fluid discharged from the bottom of the separation chamber;
   b. a means to remove the separated solid material; and
   c. a means to recirculate the clean separation fluid for re-use.

9. A process for the separation of a mixed feedstock composition-of-matter which at least in part contains particulate solids and liquids, wherein the finely divided solid components possess different values of the rate of sedimentation, respectively, said process comprising a means to mix the particulate solids in a mixed feedstock solution, provide means to liberate the fine particles from the course fraction, provide a means to separate the clean course fraction from the liquid and solid components, and provide a means for separation the liquids and finely divided unwanted solid particles from the clean solid fractions by providing and upwardly flowing separation fluid in a vertically arranged separation device, said separation fluid passing through the separation process in at least one second separation zone of higher elevation in substantially laminar flow, in one further separation zone of lower elevation in turbulent flow, and one further separation zone of higher elevation in substantially laminar flow. said feedstock being introduced into the third separation zone with the velocity of the turbulent diagonal upward flow being controllable and having been adapted to match the velocity of the sedimentation of the particulate feedstock contained, so that at least part of the particulate feedstock migrates downwardly from the first and second separation zones at a lower portion thereof.

10. The process according to claim 9, further including a third separation zone at a lower elevation than the second separation zone, the flow rate in the third separation zone of said phase containing the separation fluid is adjusted so that the portions which are to be removed from the feedstock and which have comparably higher buoyancy and the portions of the feedstock which are homogeneously miscible with the separation fluid, are carried upward.

11. The process according to claim 9, further including a fourth separation zone above the third separation zone, the flow rate in the fourth separation zone of said phase containing the separation fluid is adjusted so that the portions removed in the third separation zone are carried upward and discharged from the system at the upper end thereof.

12. The process according to claim 9, further including discharging the settled particulate material at a lower end of the third separation zone by means of a stream of the separation fluid which is fed to this lower end and in turn removed therefrom together with the settled particulate material, wherein said liquid stream is at least partially recycled after the removal of the discharged particulate material.

13. The process according to claim 9, further including a feedstock pre-conditioned in a multistage pre-treatment process which is subjected to the separation process.

14. The process according to claim 9, further including a mixing zone where the feedstock and pre-treatment liquids are tumbled and mixed into a flowable slurry.

15. The process according to claim 9, further including a lifting chute that deposits the preconditioned feedstock into the scrubbing and washing zone.

16. The process according to claim 9, further including flights in the washing plant that auger the pre-conditioned feedstock the length of the scrubbing and washing area.

17. The process according to claim 9, further including lifters between the flights that cause the feedstock mixture to be tumbled as the washing plant rotates.

18. The process according to claim 9, further including a rotating drum screen and or grizzly or combinations of both to classify and separate the clean course solid fractions into one or more sizes from the fine solid particles and liquids.

19. The process according to claim 9, further including a process for using a portion of the waste streams to assist in classifying the feedstock through the drum screen(s) and or bar grizzly.

20. The process according to claim 9, further including a process for using a portion of the recirculated clean separation fluid as a final rinse prior to the clean oversize solids being discharged from the system.

* * * * *